US012800611B1

(12) United States Patent
Hyun et al.

(10) Patent No.: US 12,800,611 B1
(45) Date of Patent: Nov. 17, 2026

(54) MEASUREMENT SYSTEM WITH DETECTION MECHANISM AND METHOD OF OPERATION THEREOF

(71) Applicant: Park Systems Corp., Gwacheon-si (KR)

(72) Inventors: Changbae Hyun, Pohang (KR); Dongryul Kim, Yongin-si (KR); Ahjin Jo, Seoul (KR); Sang-il Park, Seongnam-si (KR)

(73) Assignee: Park Systems Corp., Suwon (KR)

( * ) Notice: Subject to any disclaimer, the term of this patent is extended or adjusted under 35 U.S.C. 154(b) by 0 days.

(21) Appl. No.: 19/659,187

(22) Filed: Apr. 27, 2026

(51) Int. Cl.
*G01Q 10/04* (2010.01)
*G01Q 60/38* (2010.01)

(52) U.S. Cl.
CPC ............ *G01Q 10/04* (2013.01); *G01Q 60/38* (2013.01)

(58) Field of Classification Search
CPC .............................. G01Q 10/04; G01Q 60/38
USPC ........................................................ 850/3
See application file for complete search history.

(56) References Cited

U.S. PATENT DOCUMENTS 4,724,318 A 2/1988 Binnig
6,800,984 B2 10/2004 Marth
6,871,527 B2 3/2005 Hansma et al.
7,579,752 B2 8/2009 Haft et al.
7,709,791 B2 * 5/2010 Jo .......................... G01Q 70/02 250/252.1
8,063,383 B2 11/2011 Pryadkin et al.
8,370,960 B2 2/2013 Proksch et al.
8,474,060 B2 6/2013 Phan et al.
9,692,323 B2 6/2017 Kortschack et al.
9,722,512 B2 8/2017 Rass et al.
10,250,164 B2 4/2019 Hübner
10,505,470 B2 12/2019 Zech et al.
11,606,045 B2 3/2023 Gao et al.
2003/0015653 A1 1/2003 Hansma et al.
(Continued)

FOREIGN PATENT DOCUMENTS

EP 0823738 B1 9/2005

OTHER PUBLICATIONS

S.H. Pan; E.W. Hudson; and J.C. Davis; 3He refrigerator based very low temperature scanning tunneling microscope;pp. 1459 to 1463; Review of Scientific Instruments; vol. 70, No. 2; Feb. 1999; 0034-6748/99/70(2)/1459/5/$15.00; © 1999 American Institute of Physics.

*Primary Examiner* — Michael Maskell
(74) *Attorney, Agent, or Firm* — Perspectives Law Group, Corp.

(57) ABSTRACT

A method of operation of a measurement system includes: receiving a removable probe with a detachable head defining a probe location; removably mounting the detachable head on a structural assembly utilizing an alignment interface of the structural assembly; receiving a sample with a sample stage; moving the sample stage with a scanner assembly relative to the probe location; attaching an optical beam-deflection subsystem, including a photodetector, to the structural assembly and separate from the scanner assembly; and positioning the detachable head with the alignment interface after remounting to the structural assembly providing the probe location occupying a position at which a light beam from the optical beam-deflection subsystem is directed to the removable probe and the light beam reflected from the removable probe is directed to the photodetector.

20 Claims, 16 Drawing Sheets

(56) References Cited

U.S. PATENT DOCUMENTS

| | | | |
|---|---|---|---|
| 2003/0085633 | A1 | 5/2003 | Marth |
| 2008/0148589 | A1 | 6/2008 | Haft et al. |
| 2010/0115671 | A1 | 5/2010 | Pryadkin et al. |
| 2010/0275334 | A1 | 10/2010 | Proksch et al. |
| 2012/0278957 | A1 | 11/2012 | Phan et al. |
| 2014/0132112 | A1 | 5/2014 | Kortschack et al. |
| 2014/0152147 | A1 | 6/2014 | Rass et al. |
| 2017/0099017 | A1 | 4/2017 | Hübner |
| 2017/0310247 | A1 | 10/2017 | Zech et al. |
| 2021/0075345 | A1 | 3/2021 | Gao et al. |

* cited by examiner

MEASUREMENT SYSTEM WITH DETECTION MECHANISM AND METHOD OF OPERATION THEREOF

TECHNICAL FIELD

An embodiment of the present invention relates generally to a measurement system, and more particularly to a system with a detection mechanism.

BACKGROUND

In the field of microscopy and material characterization, atomic force microscopy (AFM) and other scanning probe microscopy techniques can be used to measure surface features and sample responses of materials. These methods can be applied in areas including semiconductor research, materials development, and biological studies to obtain information about physical and electrical characteristics of a sample. In some use cases involving small features and complex geometries, it can become increasingly difficult to achieve high measurement fidelity together with practical scan throughput.

Thus, a need still remains for a measurement system that can provide high spatial resolution together with stable performance across a range of operating conditions and materials. In view of the ever-increasing commercial competitive pressures, along with growing manufacturing needs, manufacturing expectations, and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a measurement system including: a structural assembly with an alignment interface; a detachable head configured to receive a removable probe and defining a probe location and removably mounted on the structural assembly utilizing the alignment interface; a sample stage configured to receive a sample; a scanner assembly configured to move the sample stage relative to the probe location; an optical beam-deflection subsystem, including a photodetector, attached to the structural assembly and separate from the scanner assembly; and wherein the alignment interface is configured to position the detachable head after remounting to the structural assembly providing the probe location occupying a position at which a light beam from the optical beam-deflection subsystem is directed to the removable probe and the light beam reflected from the removable probe is directed to the photodetector.

An embodiment of the present invention provides a method of operation of a measurement system including: receiving a removable probe with a detachable head defining a probe location; removably mounting the detachable head on a structural assembly utilizing an alignment interface of the structural assembly; receiving a sample with a sample stage; moving the sample stage with a scanner assembly relative to the probe location; attaching an optical beam-deflection subsystem, including a photodetector, to the structural assembly and separate from the scanner assembly; and positioning the detachable head with the alignment interface after remounting to the structural assembly providing the probe location occupying a position at which a light beam from the optical beam-deflection subsystem is directed to the removable probe and the light beam reflected from the removable probe is directed to the photodetector.

An embodiment of the present invention provides a non-transitory computer-readable medium storing an instruction that, when executed by a control circuit of a measurement system, causes the control circuit to perform functions including: receiving a removable probe with a detachable head defining a probe location; removably mounting the detachable head on a structural assembly utilizing an alignment interface of the structural assembly; receiving a sample with a sample stage; moving the sample stage with a scanner assembly relative to the probe location; attaching an optical beam-deflection subsystem, including a photodetector, to the structural assembly and separate from the scanner assembly; and positioning the detachable head with the alignment interface after remounting to the structural assembly providing the probe location occupying a position at which a light beam from the optical beam-deflection subsystem is directed to the removable probe and the light beam reflected from the removable probe is directed to the photodetector.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
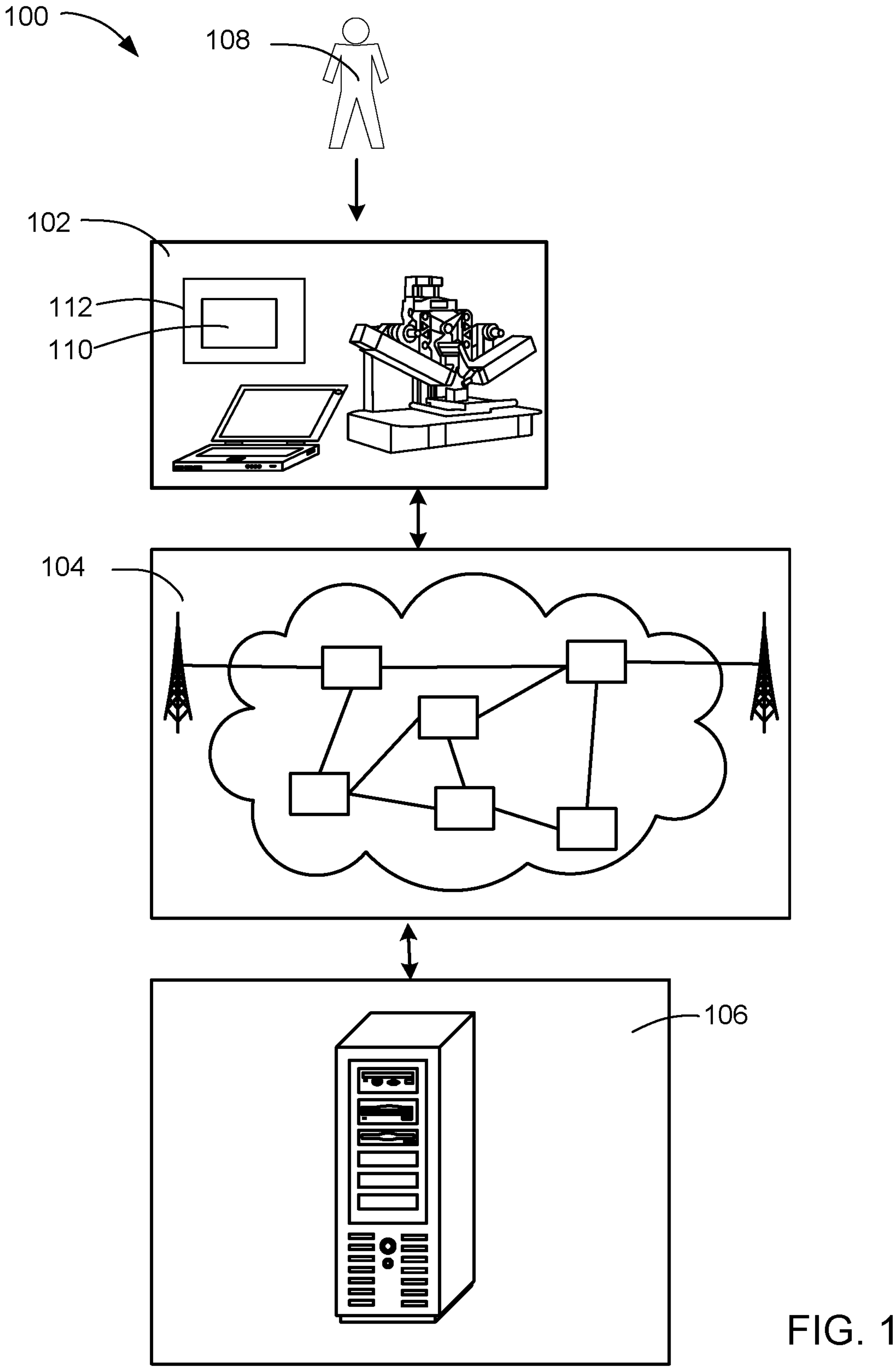
FIG. 1 is an example of a system architectural diagram of a measurement system with a detection mechanism in an embodiment of the present invention.

Various embodiments of the present invention are described with reference to a compact modular scanning probe microscope (SPM) system, such as an atomic force microscope (AFM), that includes a modular probe head configured to minimize a mechanical loop between a probe and a sample, a scanner module configured to provide fine positioning of the probe relative to the sample, a coarse positioning mechanism configured to translate the probe and/or sample over a larger range, and an optical detection subsystem mechanically arranged to reduce sensitivity to environmental vibration and drift, thereby improving stability, compactness, and serviceability during sample characterization.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, certain circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components are described as a matter of descriptive convenience and are not intended to have any other significance or provide limitations for an embodiment of the present invention.

The embodiments can be numbered as first embodiment, second embodiment, etc. or can be described without a numeric designation as a matter of descriptive convenience and are not intended to have any other significance or provide limitations for an embodiment of the present invention. The terms first, second, etc. or without a numeric designation can be used throughout as part of element names and are used as a matter of descriptive convenience and are not intended to have any other significance or provide limitations for an embodiment.

The term “module”, “unit”, “circuit”, “mechanism”, “device”, or “component” referred to herein can include or be implemented as or include software running on specialized hardware, hardware, or a combination thereof in the present invention in accordance with the context in which the term is used. For example, the software can provide instructions and can be implemented as machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a “module”, a “unit”, a “circuit”, a “mechanism”, a “device”, or a “component” is written in the claims section below, the “module”, “unit”, “circuit”, “mechanism”, “device”, or “component” is deemed to include hardware circuitry for the purposes and the scope of the claims.

For example, the hardware can include a scanning probe microscope head assembly, cantilevers or probes with probe tips, a scanner module configured to provide fine positioning of the probe relative to the sample, a coarse positioning mechanism configured to translate at least one of the probe or the sample over a larger range, an optical detection subsystem configured to detect a response of the probe, and a structural assembly supporting the probe, the scanner module, the coarse positioning mechanism, and the optical detection subsystem, wherein the scanner module is positioned between the probe and at least a portion of the coarse positioning mechanism along a mechanical path of the system, the optical detection subsystem is mounted such that motion of the coarse positioning mechanism produces reduced disturbance in the detected response of the probe, and at least one of the scanner module, the probe, or a sample stage is removably coupled to the structural assembly, or a combination thereof. Also for example, the hardware can include vibration-isolation platforms, environmental enclosures, signal-conditioning circuits, actuator driver circuits, signal processing circuits, data-acquisition units, or other components for compact modular scanning probe microscopy, or a combination thereof.

As a specific example, the signal sources can include waveform generators or drive circuits configured to provide scan waveforms for the scanner module and positioning drive signals via actuator drivers to the coarse positioning mechanism to effect fine positioning and larger-range translation of the probe and/or sample, including inertial-actuation or stick-slip drive signals in some embodiments. As another specific example, the signal sources can include light-source and detector signals associated with an optical detection subsystem configured to detect a response or deflection of the probe, or a combination thereof during low-noise, low-drift sample characterization and alignment of the sample relative to the probe.

The modules, units, circuits, mechanisms, devices, or components in the following description of the embodiments can be coupled or attached to one another as described or as shown, as examples. The coupling or attachment can be direct or indirect, with or without intervening items between coupled or attached modules, units, circuits, mechanisms, devices, or components. The coupling or attachment can be by physical contact or by signal communication between modules or units or circuits or mechanisms, such as wired or wireless communication.

It is also understood that the nouns or elements in the embodiments can be described as a singular instance. It is understood that the usage of singular is not limited to singular, but the singular usage can be applicable to multiple instances for any particular noun or element in the application. The numerous instances can be the same or similar or can be different.

Referring now to FIG. 1, therein is shown an example of a system architectural diagram of a measurement system 100 with a detection mechanism 112 in an embodiment of the present invention. One or more embodiments address measurement functions of the measurement system 100 as a distributed platform in which exchanges of commands and data can occur with a detection mechanism 112 across a network topology. One or more embodiments address AFM measurement functions of the measurement system 100 as a distributed platform in which commands and data are exchanged among the first device 102, the second device 106, the detection mechanism 112, or a combination thereof over the network 104. For example, the detection mechanism 112 includes AFM scanner hardware and control electronics configured to sense a probe-sample interaction and provide an interaction signal for feedback control.

The measurement system 100 can include a first device 102, such as a client or a server, connected to a second device 106, such as a client or server. The first device 102 can communicate with the second device 106 through a network 104, such as a wireless or wired network. For example, the first device 102 that implements the AFM instrument and a local controller is connected to the second device 106. For example, the first device 102 can implement a user interface support for an AFM instrument while the second device 106 can provide at least one of data logging or post-processing. For example, the first device 102 is a local computing device that hosts at least one atomic force microscope instrument and associated control circuitry for operating the instrument. For example, the second device 106 is a remote computing resource configured to perform at least one of data logging, post-processing, or remote user interface support for the measurement system 100.

For example, the first device 102 can be of any of a variety of computing devices, such as a measurement equipment, a computer, a notebook computer, or other multi-functional device. Also, for example, the first device 102 can be included in a device or a sub-system. As a specific example, the first device 102 can be an atomic force microscope (AFM) including scanning probe microscopy instrument. The first device 102 can support a compact AFM architecture in which larger-range positional adjustment can be provided in addition to fine positioning and in which scanner, sample, and probe components can be exchanged for service or setup.

For example, the first device 102 can function as an atomic force microscope (AFM). As an example, the first device 102 positions a probe or cantilever tip near or in contact with a sample 110, measures the interaction forces between the probe and the sample 110, and detects corresponding deflection or response signals. Also for example, the collected signals can include response data, which are processed to produce maps of topography, or other electrical or material parameters of the sample 110. As another example, the second device 106 can perform data extraction, data reconstruction, calibration or analysis using signal-processing algorithms, artificial intelligence (AI) models, machine-learning models, or other computational techniques. For example, the sample 110 is a sample characterized by the measurement system 100 using an AFM scan that produces at least topography information. For example, the probe interaction signal can represent an oscillation amplitude of a probe tip used for feedback operation at a setpoint during non-contact scanning. For example, response detection in the first device 102 can be performed with a beam-deflection arrangement that is mechanically arranged relative to scanner-side motion so that disturbance from larger-range positioning can be reduced. For example, the first device 102 can support removable or interchangeable scanner-side, probe-side, or sample-side structures to improve serviceability.

For example, the user 108 supplies the sample 110 to the first device 102 with the detection mechanism 112, and the first device 102 captures response signals from the sample 110 and processes data generated from the signals. The detection mechanism 112 includes AFM scanner and probe-control electronics, feedback circuitry, and excitation circuitry to drive a probe with a mechanical excitation, detecting responses corresponding to tip-sample interactions, and analyzing the detected responses to determine material or electrical information of the sample 110. As another example, the first device 102 can perform all computations locally or, via the network 104, off-load part of the computation workload or share the local computation results with the second device 106 with a higher processing capacity for additional processing and storage. The detection mechanism 112 can support a compact modular AFM configuration in which larger-range positioning can be provided in addition to fine positioning. For example, the detection mechanism 112 can support exchange of scanner-side, sample-side, or probe-side structures and can support X or Y alignment by stick-slip motion while beam-deflection sensing is maintained.

For illustrative purposes, the sample 110 is shown in the detection mechanism 112, although it is understood that the sample 110 can be outside of the detection mechanism 112. For example, the sample 110 can be mounted on a stage or chuck of the AFM and provided to the first device 102 to be characterized or tested. For example, the sample 110 can include semiconductor metrology structures. The sample 110 can be mounted on a removable stage, disk, or other support of the AFM instrument, and relative motion between the sample 110 and the probe can be provided by fine positioning and larger-range positioning in the compact measurement architecture. The detection mechanism 112 can support a compact modular AFM configuration in which larger-range positioning can be provided in addition to fine positioning. For example, the detection mechanism 112 can support exchange of scanner-side, sample-side, or probe-side structures and can support X or Y alignment by stick-slip motion while beam-deflection sensing is maintained.

For illustrative purposes, the detection mechanism 112 is shown in the first device 102, although it is understood that the detection mechanism 112 can be implemented in a different manner. For example, the detection mechanism 112 can be distributed between the first device 102 and the second device 106. Also for example, the first device 102 can include multiple probes and/or multiple instruments that independently operate AFM probes for parallel measurements across multiple samples 110, and the collected information for all of the samples 110 can be transferred to the second device 106 for combined analysis or comparison. For example, the multiple samples 110 can be characterized in parallel by the measurement system 100.

The first device 102 can couple, either directly or indirectly, to the network 104 to communicate with the second device 106 or can be a stand-alone device. The first device 102 can further be separated from or incorporated with a smart phone, a tablet computer, a desktop, a laptop computer, a scanner, or other personal electronic devices or can include an embedded controller within the instrument chassis.

The second device 106 can be any of a variety of centralized or decentralized computing devices. For example, the second device 106 can be a computer, workstation, server, grid computing resources, a virtualized computer resource, cloud computing resource, routers, switches, peer-to-peer distributed computing devices, or a combination thereof. In an embodiment, the second device 106 can execute image-processing or data-classification software for AFM datasets.

The second device 106 can be centralized in a single room, distributed across different rooms, distributed across different geographical locations, embedded within a telecommunications network, on-premises, or remote. The second device 106 can couple with the network 104 to communicate with the first device 102. The second device 106 can also be a client type device as described for the first device 102. For example, the second device 106 can receive the AFM deflection signals and perform advanced analysis, visualization, or data storage. For example, the first device 102, the second device 106, or a combination thereof can store at least a portion of the received measurement data in a data store for later analysis or comparison. For example, the data store is memory or other storage configured to log measurement data generated by the measurement system 100. For example, the data store can be implemented using storage resources of the second device 106.

Also, for illustrative purposes, the measurement system 100 is described with the second device 106 as a computing device, although it is understood that the second device 106 can be different types of devices. Also, for illustrative purposes, the measurement system 100 is shown with the second device 106 and the first device 102 as endpoints of the network 104, although it is understood that the measurement system 100 can include a different partition between the first device 102, the second device 106, and the network 104. For example, the first device 102, the second device 106, or a combination thereof can also function as part of the network 104 and host services for instrument control, data streaming, and user interfaces.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

For example, a user 108 can utilize the first device 102 to initiate or supervise a measurement sequence of a sample 110, while the second device 106 can receive sensed measurement information, execute analytical routines, and return processed measurement information to the user 108. As an example, the user 108 can be an operator, a laboratory technician, an engineer, a scientist, or any other users of the measurement system 100. Also as an example, the second device 106 can be implemented as centralized or decentralized computing resources. This partition of control and computation can allow AFM measurements to be performed locally while remote or higher-level devices perform analysis, calibration, device health monitoring, or visualization of results.

For example, the second device 106 can host portions of the detection mechanism 112 for executing the analytical routines using the sensed measurement information. As an example, the detection mechanism 112 can include a probe control circuit, feedback electronics, and detection circuitry. Further details for operations, components, and technical aspects of the detection mechanism 112 will be described below in the description of the measurement system 100.

Figure 2:
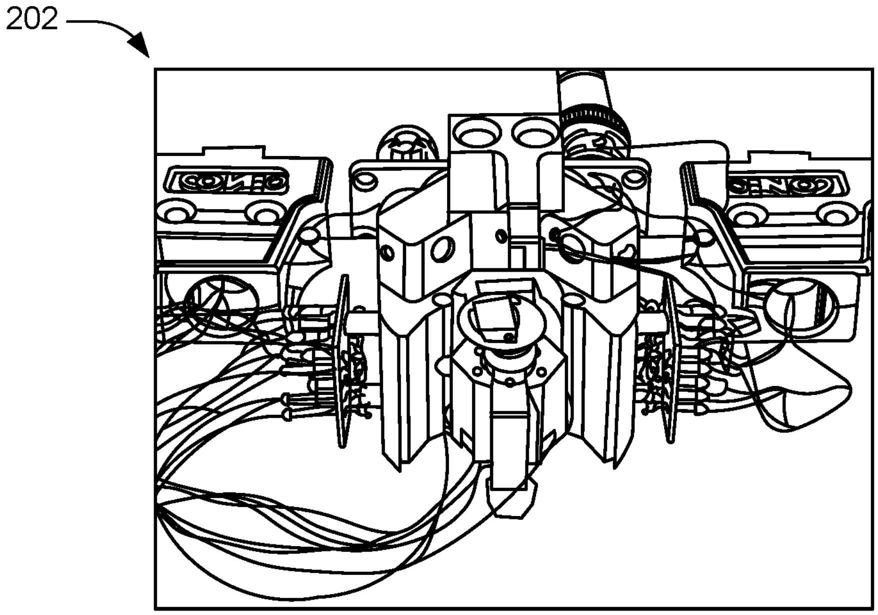
FIG. 2 is an example of a microscope head.

Referring now to FIG. 2, therein is shown an example of a microscope head 202. The microscope head 202 can be implemented in a compact atomic force microscope system. The example illustrates a perspective view of the microscope head 202. In this example, the microscope head 202 provides a compact arrangement for supporting probe-side and sample-side components. For example, the compact atomic force microscope system can be configured for use with a Z-axis stick-slip motor. The compact arrangement of the microscope head 202 can provide a shortened mechanical loop between the sample 110 of FIG. 1 and a probe, which can support low-drift, low-noise imaging, including atomic lattice imaging.

Figure 3:
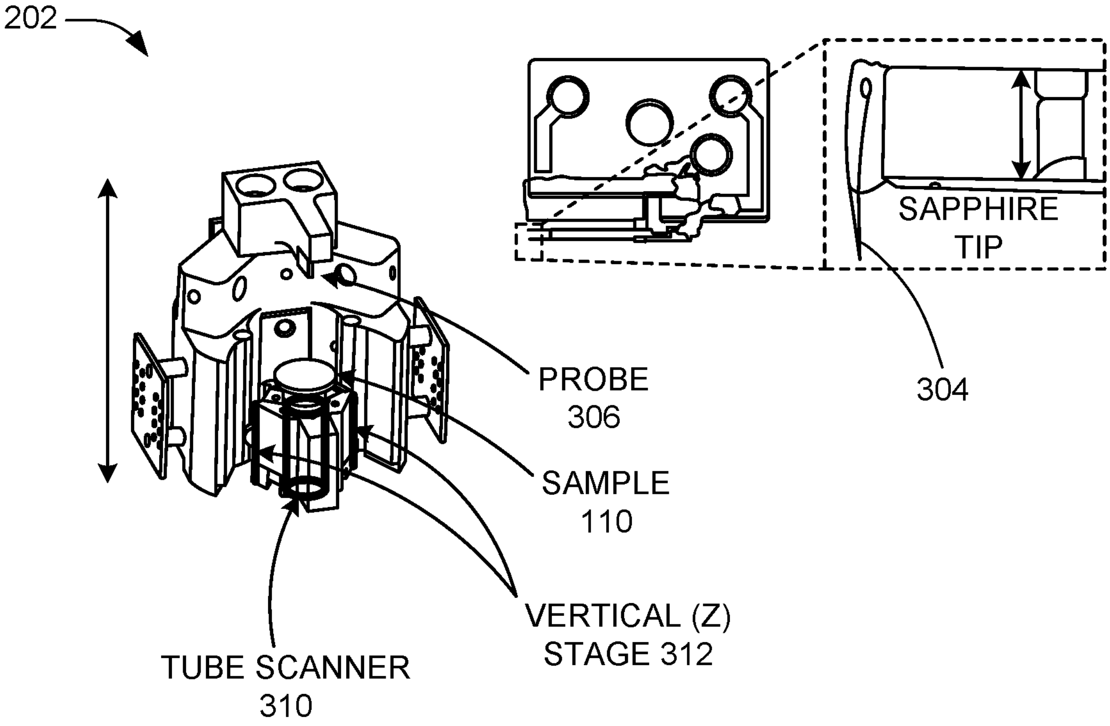
FIG. 3 is an implementation example of the microscope head.

Referring now to FIG. 3, therein is shown an implementation example of the microscope head 202. The example illustrates the microscope head 202 in a perspective view together with an inset and a magnified detail of a distal tip region. The microscope head 202 can include a probe tip 304 shown in the magnified detail and is linked by guide lines to a corresponding region of the microscope head 202. For example, the probe tip 304 is a hard distal tip structure formed from a material, including sapphire or any other tip materials. The probe tip 304 can be configured to interact with a surface of the sample 110 during scanning. For example, the microscope head 202 can have an overall height of approximately 45 millimeters (mm). For illustration purposes, the microscope head 202 is shown with approximately 45 mm, although it is understood that the microscope head 202 can include any other height.

For example, a removable probe 306 extends toward a sample-side region of the microscope head 202 and is identified as a probe-side sensing component of the microscope head 202. By way of an example, the removable probe 306 is a sensor or a sensing structure that supports the probe tip 304 for interaction with the sample 110. For example, the removable probe 306 can include a qPlus sensor or another probe-side sensing structure. The sample 110 can be positioned below the removable probe 306 so that the removable probe 306 is arranged for scanning or measurement relative to the sample 110.

For example, a tube scanner 310 is arranged in a lower central portion of the microscope head 202. By way of an example, the tube scanner 310 is a scanning structure that supports a sample-side region and provides a lateral-vertical (XYZ) motion relative to the removable probe 306. For example, the tube scanner 310 is a piezoelectric tube scanner. For example, a vertical stage 312 is positioned parallel to the tube scanner 310 and provides (coarse) positioning along a vertical direction relative to the removable probe 306. By way of an example, the vertical stage 312 is a motor configured to move the sample-side region along the vertical direction. For example, the vertical stage 312 is a stick-slip piezo motor. For example, the tube scanner 310 can provide a scan range of approximately 3 micrometers (μm)×3 μm×1 μm, or any other scan range.

Figure 4:
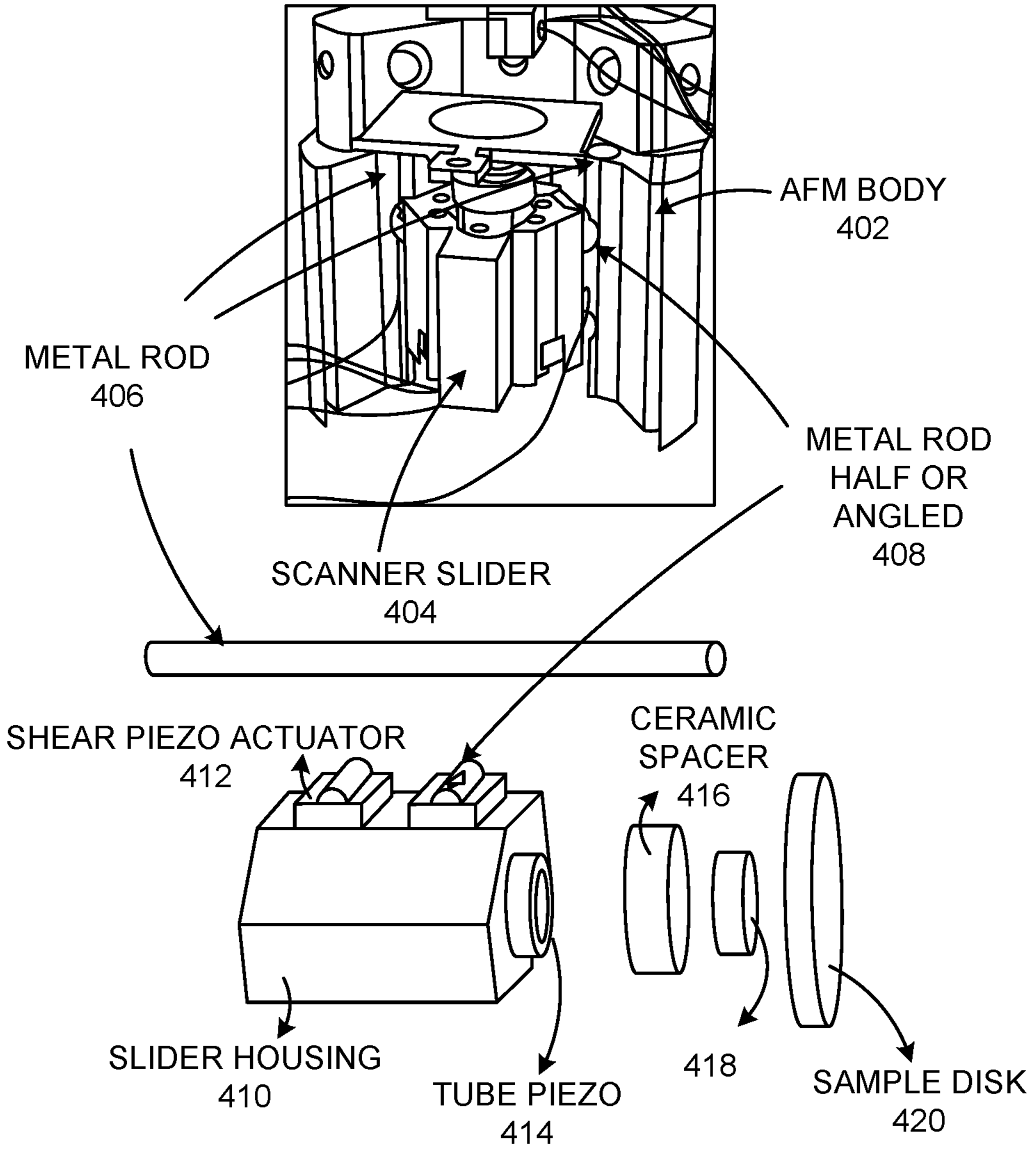
FIG. 4 is an example of the vertical stage of the microscope head.

Referring now to FIG. 4, therein is shown an example of the vertical stage 312 of the microscope head 202. The example illustrates an enlarged view of the vertical stage 312 with scanner slider parts. In an upper portion of the figure, a body 402 (e.g., AFM body) can define a surrounding frame, a scanner slider 404 can be positioned within the body 402, a first contact member 406 can be arranged at an interface region between the scanner slider 404 and the body 402, and a second contact member 408 can be further arranged at the interface region between the scanner slider 404 and the body 402. For example, below the upper portion, the second contact member 408 can include a rod that can extend along a lateral direction. For example, the scanner slider 404 is configured to move relative to the body 402 while being clamped against the body 402 by a magnetic force.

By way of an example, the body 402 is a frame or housing portion of the vertical stage 312 that can receive and constrain motion of the scanner slider 404 during coarse positioning. By way of an example, the scanner slider 404 is a movable structure that can translate or move relative to the body 402 in response to actuation. By way of an example, the first contact member 406 is a metal rod that can extend along a lateral direction and can provide a durable contact or guiding surface at the slider-body interface. By way of an example, the second contact member 408 is a half rod, an angled member, or another hard contact piece, including a half or angled metal rod that can cooperate with the first contact member 406 at the slider-body interface during relative motion of the scanner slider 404 and the body 402.

In a lower portion of FIG. 4, a slider housing 410 can be shown in an exploded view with a shear piezo actuator 412 and a tube piezo 414. By way of an example, the slider housing 410 is a carrier block that can support piezoelectric (piezo) and sample-side components of the vertical stage 312. By way of an example, the shear piezo actuator 412 is a piezoelectric actuator mounted on the slider housing 410 that can generate shear displacement for a stick-slip step of the scanner slider 404. By way of an example, the tube piezo 414 is a piezoelectric tube actuator coupled to the slider housing 410 that can support a sample-side stack and can provide motion along a scanning axis or another positioning axis. For example, the first contact member 406 and the second contact member 408 can define hard contact features at the interface between the scanner slider 404 and the body 402 used during stage movement. For example, the tube scanner 310 of FIG. 3 is the tube piezo 414.

Further toward a right side of the lower portion, a spacer 416, a sample-attachment structure 418, and a sample disk 420 can be arranged in sequence outward from the tube piezo 414 to show how a sample-side structure can be supported by the vertical stage 312. By way of an example, the spacer 416 is a ceramic spacer that can provide separation, mechanical support, or a combination thereof between the tube piezo 414 and the sample-attachment structure 418.

By way of an example, the sample-attachment structure 418 is a structure, including a magnet or another attachment structure, that can couple the sample disk 420 to the tube piezo 414 through the spacer 416. By way of an example, the sample disk 420 is a disk-shaped sample support that can receive the sample 110 and can move with the scanner slider 404 during vertical (z-axis) coarse positioning or with the tube piezo 414 during finer positioning. As a specific example, shear piezo (e.g., the vertical stage 312) is only for vertical coarse positioning within approximately 15 mm range and the tube piezo 414 is only for fine positioning including atomic lattice imaging within approximately 3 μm×3 μm×1 μm range. For example, the coarse positioning can move the sample disk 420 over a greater distance, whereas the fine positioning can move the sample disk 420 over a smaller distance with greater precision. For example, the sample disk 420 can be attached to the tube piezo 414 by a magnetic force. For example, the vertical stage 312 can use a stick-slip motor structure to reposition sample-side components relative to the microscope head 202.

Figure 5:
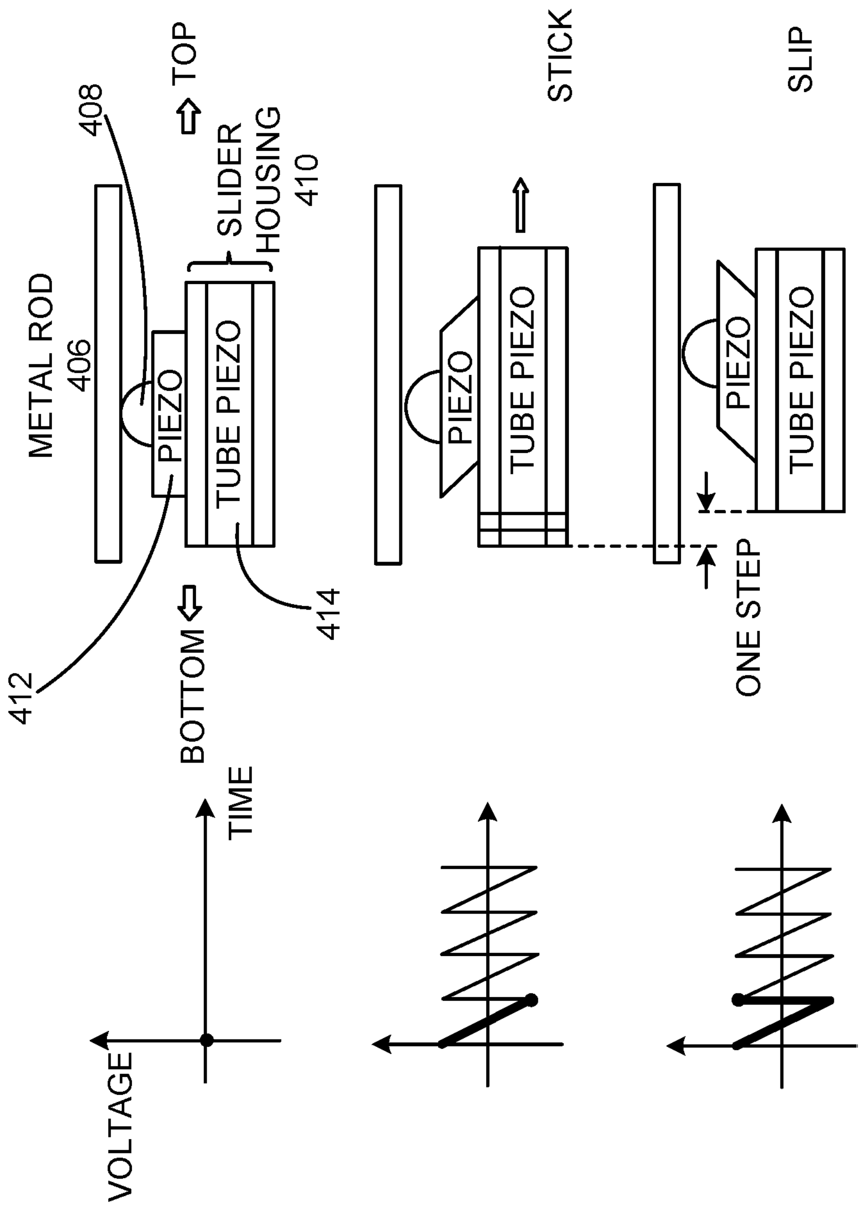
FIG. 5 is an operating example of the vertical stage during an actuation sequence.

Referring now to FIG. 5, therein is shown an operating example of the vertical stage 312 of FIG. 3 during an actuation sequence. For example, the operation can occur during a stick-slip actuation sequence. The vertical stage 312 can include a stick-slip piezo motor that can move a sample-side structure along a vertical direction and can provide coarse vertical positioning. At an upper-left region of FIG. 5, a voltage-versus-time plot can establish a reference condition, and an upper-right operating view can indicate bottom and top movement directions for the illustrated stage. At the upper-right operating view, the first contact member 406 can be positioned above the slider housing 410 or an actuated stage portion. Below the first contact member 406, the slider housing 410 can translate or move relative to the first contact member 406 during coarse vertical stepping. For example, the first contact member 406 is positioned adjacent an upper portion of the slider housing 410, and the second contact member 408 is disposed between the first contact member 406 and the slider housing 410 such that movement of the slider housing 410 occurs through contact between the first contact member 406 and the second contact member 408 during stick-slip actuation.

At a middle-left region of FIG. 5, a second voltage-versus-time plot can show an asymmetric drive profile corresponding to a stick phase, and a middle-right operating view can show the movable stage in a clamped translation condition. At an upper portion of the slider housing 410, the shear piezo actuator 412 can be shown as a piezo element, which can generate shear displacement for a step of the vertical stage 312. At a lower portion of the slider housing 410, the tube piezo 414 can be positioned below the shear piezo actuator 412 and can form part of a sample-side stack that moves with the slider housing 410 during the illustrated motion.

At a lower-left region of FIG. 5, a third voltage-versus-time plot can show a rapid return portion of the drive profile corresponding to a slip phase, and a lower-right operating view can show the actuated structure after release of the clamped condition. In the slip phase, the illustrated actuator arrangement can cooperate with the asymmetric drive profile so the slider housing 410 can remain at a vertically offset position relative to the first contact member 406 after release of the clamped condition. For example, "one step" can identify a net incremental displacement produced after the illustrated stick phase and slip phase, and dashed reference lines can indicate the before-and-after positions associated with that displacement. For example, FIG. 5 can illustrate how the vertical stage 312 can convert an asymmetric electrical drive into repeatable coarse vertical stepping.

Figure 6:
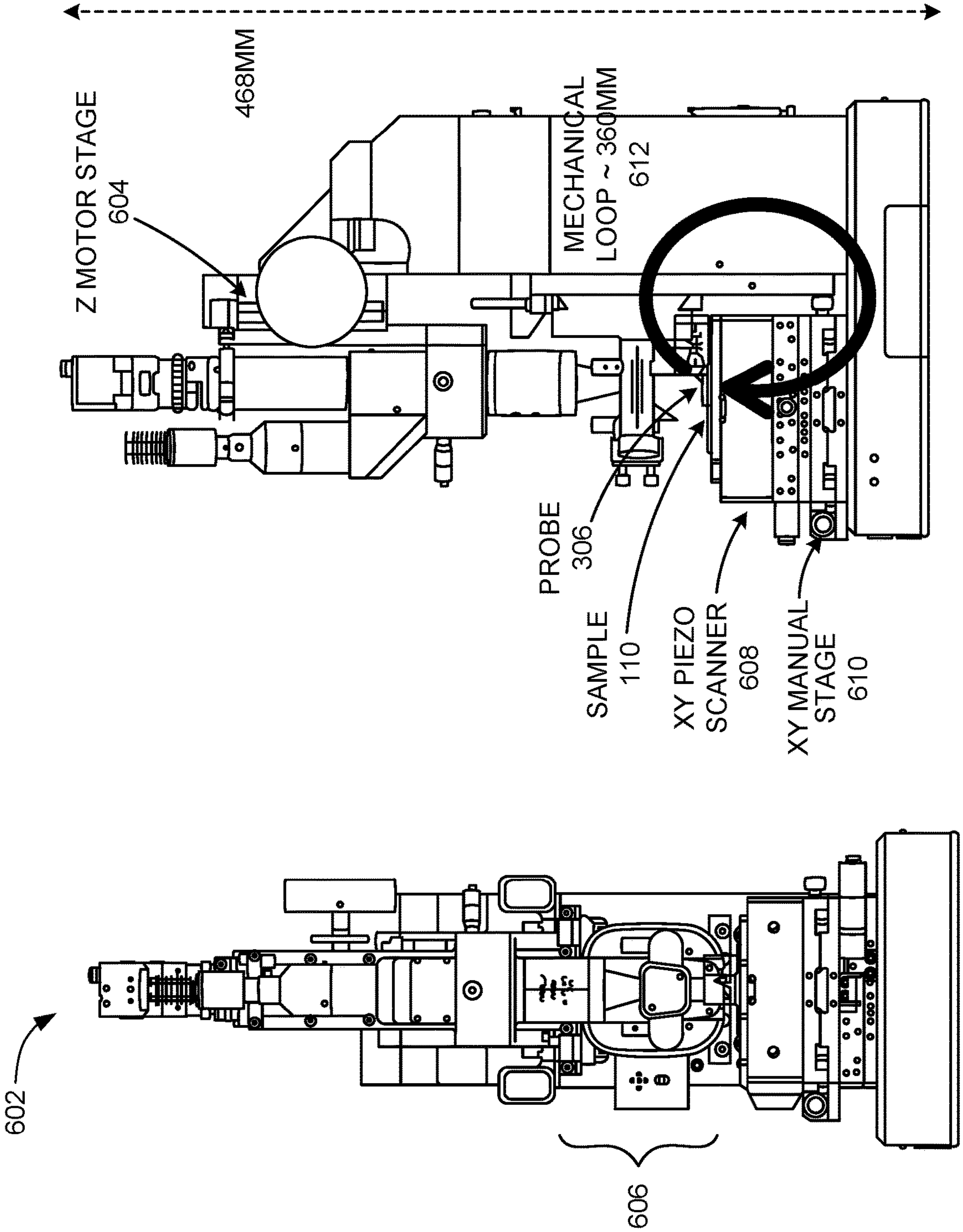
FIG. 6 is an example of a laser beam deflection arrangement.

Referring now to FIG. 6, therein is shown an example of a laser beam deflection arrangement 602. The laser beam deflection arrangement 602 can include a beam deflection method in an atomic force microscope (AFM) system. The example illustrates front and side views of the AFM system. Near an upper portion of the side view, a vertical motor stage 604 (Z motor stage) can be positioned above a lower stage stack and can provide coarse vertical positioning within an instrument frame. By way of an example, the vertical motor stage 604 is a motor-driven stage located in an upper region of the laser beam deflection arrangement 602 and can shift a probe-side component toward or away from the sample 110. Below the vertical motor stage 604, a probe-side assembly 606 can carry a probe toward the sample 110.

Below the probe-side assembly 606, a lateral piezo scanner 608 (XY piezo scanner) can be positioned in an upper part of the lower stage stack and can provide fine lateral positioning near the sample-side region. By way of an example, the lateral piezo scanner 608 is a piezo-driven scanner stage and can provide comparatively fine lateral (XY) adjustment of the sample-side region relative to the probe. Below the lateral piezo scanner 608, a lateral (XY) manual stage 610 can support the lower stage stack and can provide broader operator-set positioning in the lateral plane. By way of an example, the lateral manual stage 610 is a manually adjustable stage and can position the lateral piezo scanner 608 beneath the probe-side assembly 606. The side view can show that the vertical motor stage 604, the probe-side assembly 606, the lateral piezo scanner 608, and the lateral manual stage 610 are distributed over a vertical span. For example, the overall instrument height can be approximately 468 mm.

The vertical motor stage 604, the probe-side assembly 606, the lateral piezo scanner 608, and the lateral manual stage 610 can collectively define a mechanical loop 612 extending through the illustrated support path between the probe and the sample 110. By way of an example, the mechanical loop 612 is a structural path between the probe and the sample 110 through intervening support components. For example, the laser beam deflection arrangement 602 can include a large value of approximately 360 mm for the mechanical loop 612. For example, it is not easy to get or capture atomic lattice images with the mechanical loop 612 as a relatively long loop shown in FIG. 6.

Figure 7:
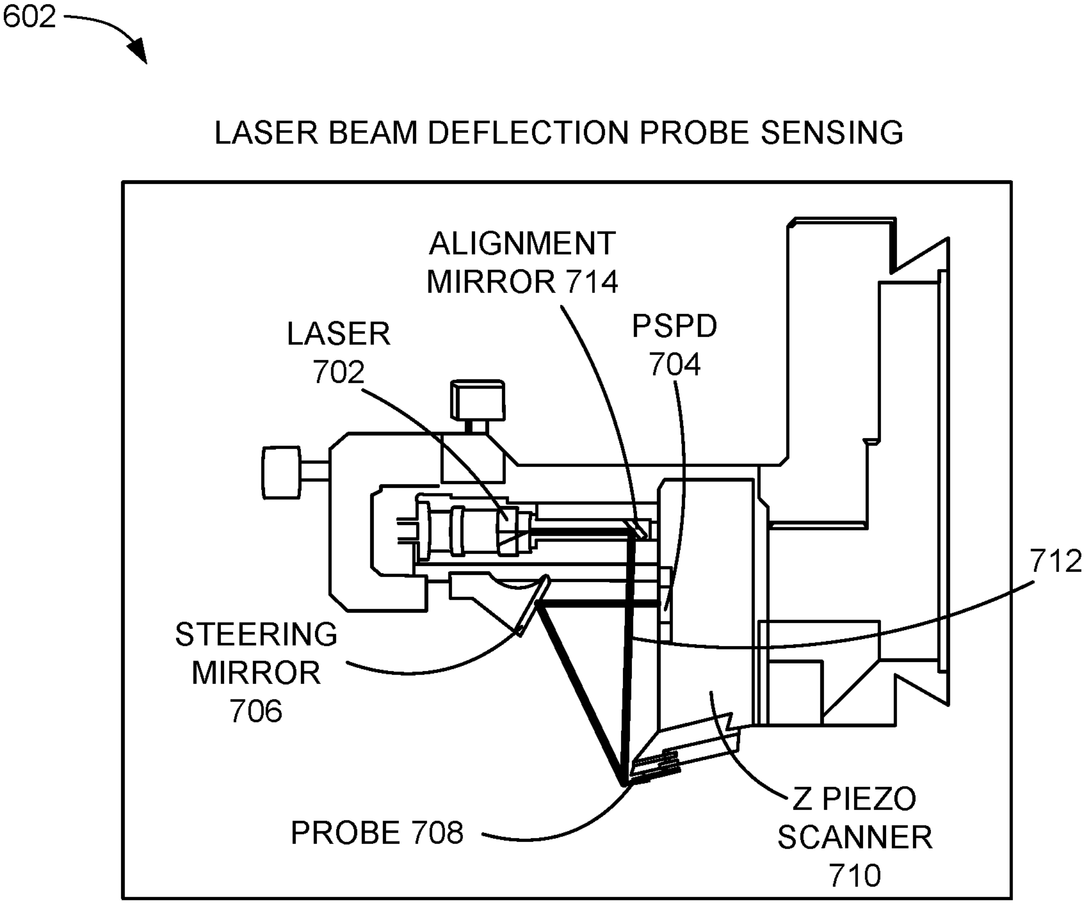
FIG. 7 is an example of a side view of the laser beam deflection arrangement.

Referring now to FIG. 7, therein is shown an example of a side view of the laser beam deflection arrangement 602. FIG. 7 can illustrate a side detail of the laser beam deflection arrangement 602. A laser 702 can be positioned in an upper-left portion of the laser beam deflection arrangement 602 and can define a beginning of an optical sensing path within the laser beam deflection arrangement 602. A position-sensitive photodetector 704 (PSPD) can be positioned to the right of the laser 702 in an upper central region of the laser beam deflection arrangement 602 and can receive position-dependent light for detection.

Below the laser 702, a steering mirror 706 can be disposed in a lower-left portion of the laser beam deflection arrangement 602. Below the position-sensitive photodetector 704 and to the right of the steering mirror 706, a probe 708 can be arranged at an inclined orientation near a lower central portion of the laser beam deflection arrangement 602. At a lower-right portion of the laser beam deflection arrangement 602, a vertical (Z) piezo scanner 710 can support the probe 708 and can move the probe 708 along a vertical (Z) direction during a sensing operation. By way of an example, the vertical piezo scanner 710 is a piezoelectric scanner structure that can position the probe 708. A light beam 712 can be directed from the laser 702 toward the probe 708, and the light beam 712 reflected from the probe 708 to the position-sensitive photodetector 704. The laser 702 can direct light along a horizontal path toward an alignment mirror 714, which can redirect light from the laser 702 downward toward the probe 708.

Figure 8:
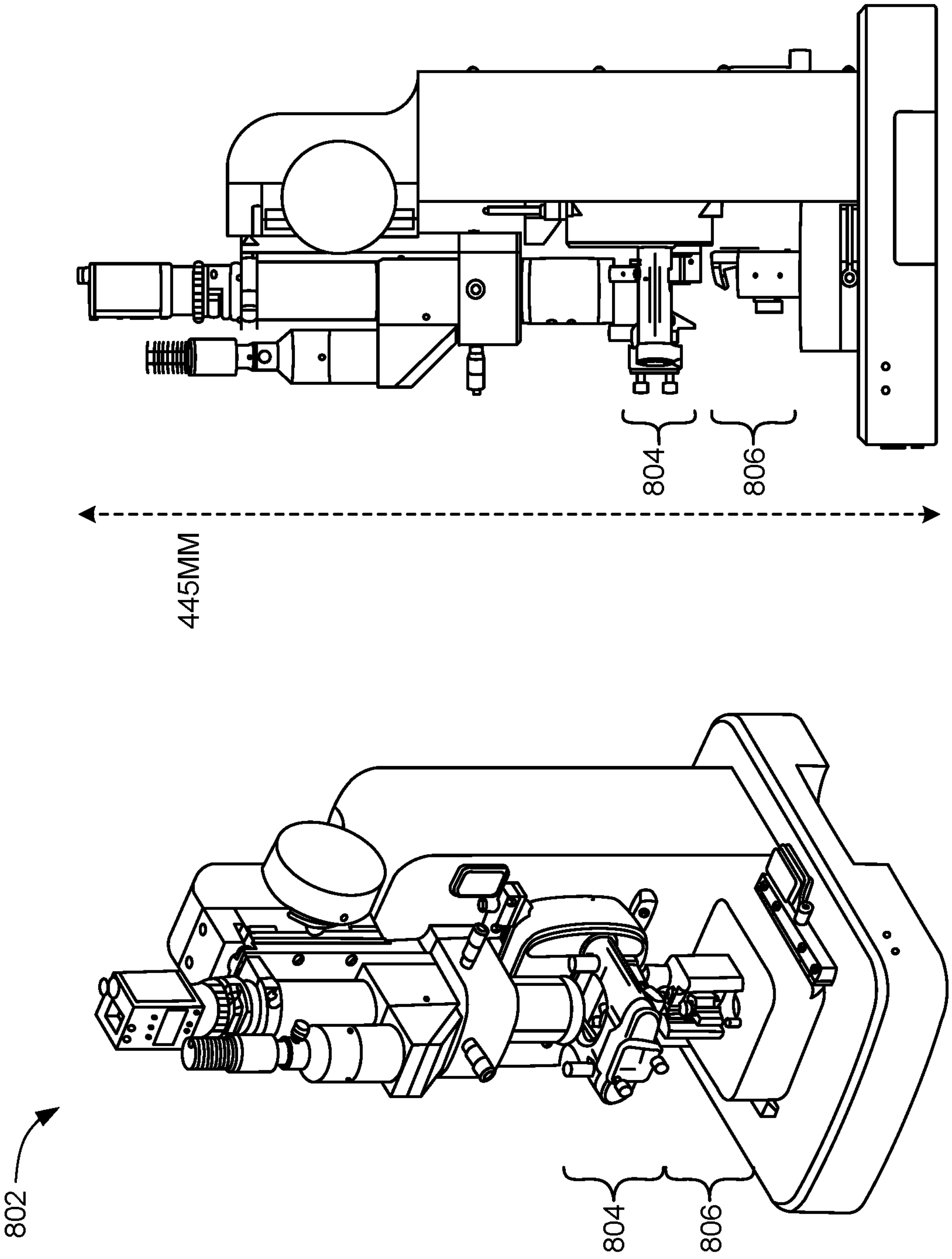
FIG. 8 is an example of a compact beam-deflection microscope arrangement in an embodiment of the present invention.

Referring now to FIG. 8, therein is shown an example of a compact beam-deflection microscope arrangement 802 in an embodiment of the present invention. The example illustrates a perspective view and a side view of the compact beam-deflection microscope arrangement 802 in the measurement system 100 of FIG. 1. By way of an example, the compact beam-deflection microscope arrangement 802 is an atomic force microscope (AFM) arrangement. Here, compact refers to a short-loop AFM head architecture with a shorter mechanical path compared to a longer mechanical path in the mechanical loop 612 of FIG. 6, since the compact beam-deflection microscope arrangement 802 provides a structure in which the probe, the sample 110, and the vertical stick-slip shear piezos and lateral stick-slip XYZ scanner are arranged close together, while the laser beam-deflection components are kept separate, thereby the compact beam-deflection microscope arrangement 802 provides a reduced mechanical loop of ~60 mm. For example, shear piezos are only for vertical stick-slip motion, and XYZ piezo scanner is for both lateral stick-slip motion and fine positioning.

Near an upper region of the figure, an optical portion 804 can be positioned on a support structure. By way of an example, the optical portion 804 is a portion of the compact beam-deflection microscope arrangement 802 that can include laser-beam-deflection hardware, which can include a laser source, a photodetector, steering optics, or a combination thereof. Below the optical portion 804, a compact AFM portion 806 can be arranged in a lower region of the figure and can define a probe-and-sample interaction region within a reduced structure path. By way of an example, the compact AFM portion 806 is a compact head-and-scanner portion that can include a fine scanner, a coarse-positioning mechanism, a probe-side region, a sample-side region, or a combination thereof positioned below the optical portion 804. For example in this context, fine refers to relatively small-range, high-resolution motion used for scanning, whereas coarse refers to relatively larger-range motion used to position, approach, or align the probe-side region and the sample-side region.

In the illustrated architecture, the compact AFM portion 806 can be positioned below the optical portion 804 so that probes and samples 110 can be separated from the laser components. A scanner region within the compact AFM portion 806 can use a single lateral-vertical (XYZ) tube piezo, a stick-slip based positioning mechanism, or a combination thereof, and the compact AFM portion 806 can support fine scanning together with coarse sample-side adjustment in a reduced package. The respective views can also show that an overall height can be approximately 445 mm in one implementation. Because the compact AFM portion 806 can operate below the optical portion 804 with the optical portion 804 separate from the compact AFM portion 806, the illustrated configuration can support low-noise and low-drift measurement together with convenient handling for scanner, sample, probe, or laser alignment operations.

Figure 9:
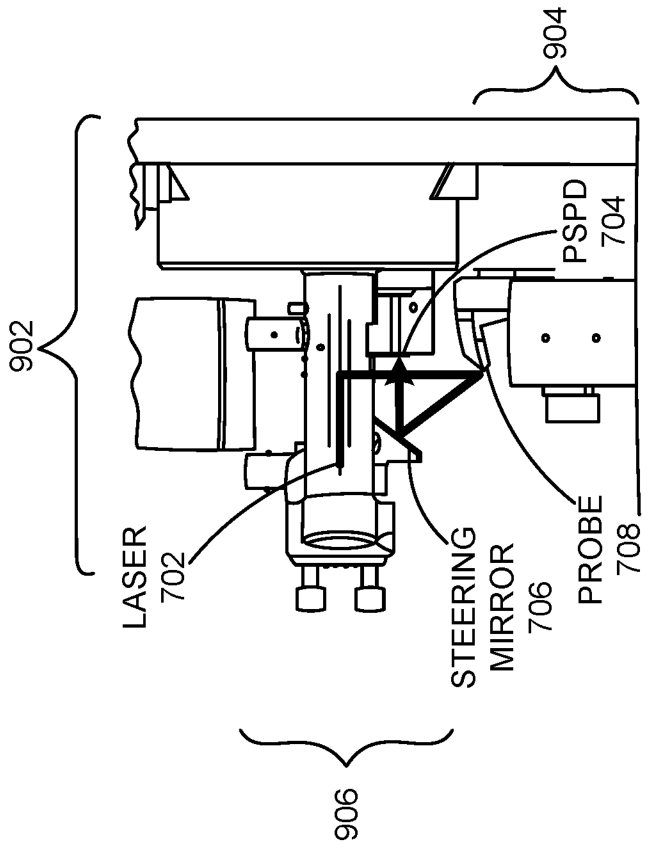
FIG. 9 is an example of a side view of a portion of the measurement system.

Referring now to FIG. 9, therein is shown an example of a side view of a portion of the measurement system 100 of FIG. 1. The example can present an optical beam-deflection subsystem 906 in a position that is physically apart from a lower probe-side region of the measurement system 100. The laser 702 can be disposed toward a left side of the figure and can direct light along a horizontal path toward the alignment mirror 714 of FIG. 7. The position-sensitive photodetector 704 can be disposed toward a right side of the figure and can receive light reflected from the probe 708. The alignment mirror 714 can be positioned to the right of the laser 702 and can redirect light from the laser 702 downward toward a probe region. The probe 708 can be positioned below the steering mirror 706 and can reflect at least a portion of the redirected light toward the position-sensitive photodetector 704.

A structural assembly 902 can be disposed along a right side and an upper supporting side of the figure and can support the separated optical components relative to the lower measurement region. By way of an example, the structural assembly 902 is a support structure of the measurement system 100 that can support a removable head, a scanner-side region, and at least a portion of the optical beam-deflection subsystem 906. A detachable head 904 can be mounted relative to the structural assembly 902 and can position the probe 708 beneath the laser-side components so that optical sensing can be performed while the laser-side components remain apart from the probe-side region. By way of an example, the detachable head 904 is a modular head portion that can be removably mounted on the structural assembly 902 and can receive the probe 708. As an example, the probe 708 is separated from the laser components. In the example, the laser 702, the position-sensitive photodetector 704, and the steering mirror 706 can remain separated from the probe 708 and a sample-side region carried by the detachable head 904. The laser 702, the steering mirror 706, and the position-sensitive photodetector 704 can be supported by the structural assembly 902 separately from the detachable head 904 so that motion of the detachable head 904 can produce reduced disturbance in a detected response from the probe 708.

Figure 10:
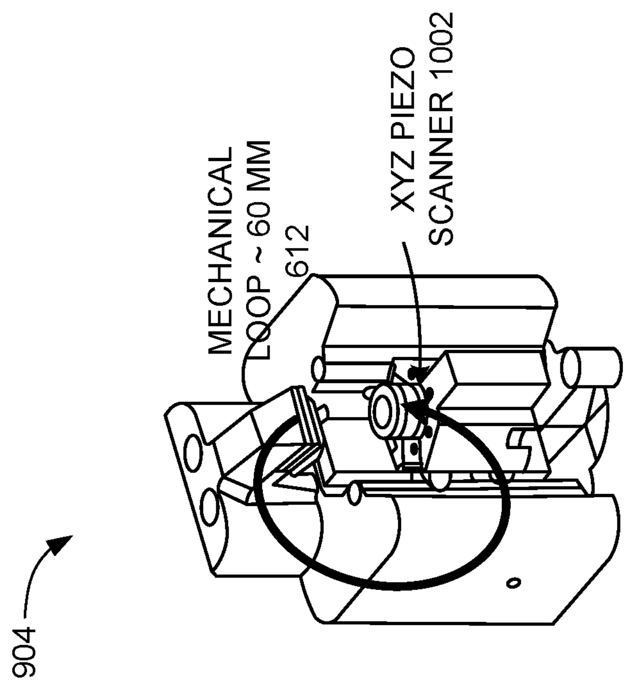
FIG. 10 is an example of the mechanical loop in the detachable head.

Referring now to FIG. 10, therein is shown an example of the mechanical loop 612 in the detachable head 904. The example illustrates a portion of the measurement system 100 of FIG. 1 shown in perspective to emphasize a compact internal load path of the disclosed scanning probe microscope system. In an upper region of the figure, the mechanical loop 612 is indicated by a bold outline. For example, the mechanical loop 612 can include a dimension of approximately 60 mm. The mechanical loop 612 can correspond to a structural path between a probe-side region and a sample-side region through intervening support components. For example, a compact scanning probe microscope (SPM) system is disclosed with a modular probe head configured to minimize the mechanical loop 612 between the probe 708 of FIG. 7 and the sample 110 of FIG. 1, and the mechanical loop 612 of ~60 mm can highlight that compact relationship in the illustrated implementation. For example, the probe 708 and the sample 110 are separated from the laser components, and the detachable head 904 can include the mechanically compact region because those optical components can be kept separate from the illustrated loop path.

In a central middle-to-lower region of the figure, a (XYZ) piezo scanner 1002 can be positioned adjacent a sample-side support region within the detachable head 904 and can provide multi-axis piezoelectric motion in the compact region bounded by the mechanical loop 612. By way of an example, the piezo scanner 1002 (or the tube piezo 414) and the shear piezo actuator 412 are piezoelectric scanner structures positioned within the detachable head 904 and configured to provide motion in lateral (X, Y) and vertical (Z) directions. For example, the vertical (Z) stage is implemented utilizing a stick-slip motor mechanism driven by the shear piezo actuator 412. For example, the lateral (XY) stage is implemented utilizing a stick-slip motor mechanism driven by a single (XYZ) tube piezo. The piezo scanner 1002 and shear piezo 412 can correspond to piezoelectric arrangement used in a compact implementation of that type. As an example, the mechanical loop 612 in the detachable head 904 provides a compact arrangement that enables low noise and low drift operations, and the structural assembly 902, the detachable head 904, and the piezo scanner (e.g., the tube piezo 414) and the shear piezo actuator 412 can cooperate to keep the mechanically relevant path (e.g., the mechanical loop 612) reduced in the compact microscope architecture shown in FIG. 10.

For example, a local mechanical path within the detachable head 904 can provide the mechanical loop 612 having a length of ~60 mm. For example, the localized path can reduce the mechanical loop 612 by about six times relative to the arrangement illustrated in FIG. 6, in which the mechanical loop 612 includes a length of ~360 mm. The shortened or reduced length of the mechanical loop 612 can facilitate acquisition of atomic lattice images by contributing to low-noise and low-drift operation. The detachable head 904 can facilitate handling of the sample 110 and the probe 708 and can simplify laser alignment because sample-side and probe-side regions can be separated from the laser components.

It has been discovered that locating the mechanical loop 612 within the detachable head 904 and positioning the (vertical) shear piezo actuator 412 within the detachable head 904 while the structural assembly 902 supports the laser 702 of FIG. 7, the steering mirror 706 of FIG. 7, and the position-sensitive photodetector 704 of FIG. 7 separately from the detachable head 904 can reduce mechanically induced disturbance between the probe 708 and the sample 110. As a result, the measurement system 100 can provide low-noise and low-drift operation in a compact arrangement and can facilitate acquisition of atomic lattice images. For example, the sample-side region can be moved automatically in lateral (XY) directions by a stick-slip motor mechanism. For example, the mechanical loop 612 is only affected by the vertical stick-slip motion and not by the lateral stick-slip motion in an example of an embodiment of the present invention. For example, the path of the mechanical loop 612 includes a distance from the (XYZ) piezo scanner 1002 to the probe 708, and XY lateral stick-slip motion does not change the distance since the position of the probe 708 is fixed.

Figure 11:
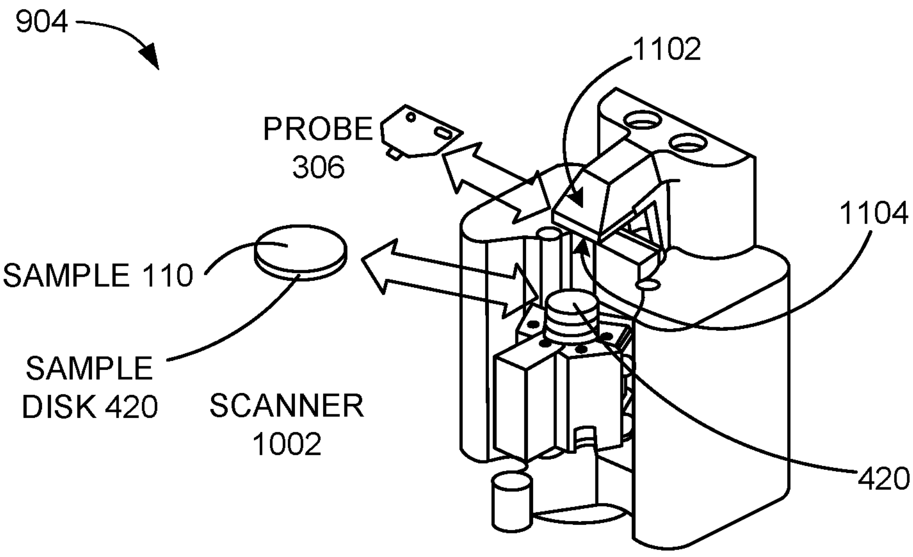
FIG. 11 is an implementation example of the detachable head.

Referring now to FIG. 11, therein is shown an implementation example of the detachable head 904. The example illustrates a partially exploded perspective view of a compact head arrangement configured for convenient handling of probe-side, sample-side, and scanner-side components. In an upper-left region of the figure, a probe-side component can be shown spaced from an upper receiving region of the detachable head 904, and the spacing can indicate that the probe-side component can be inserted into or removed from the detachable head 904. In a left-side region below the probe-side component, a sample-side component can be shown spaced from a central sample-receiving region, and the spacing can indicate that the sample-side component can be exchanged separately from the probe-side component. In a central region of the figure, a scanner-side component can remain within the detachable head 904 and can support the sample-side component beneath the probe-side component when the components are installed.

The detachable head 904 can define the compact body shown in the figure and can retain the (XYZ) piezo scanner 1002 in a central interior region below the sample disk 420. The (XYZ) piezo scanner 1002 can remain in the detachable head 904 while the sample disk 420 and the removable probe 306 are exchanged. The sample disk 420, the removable probe 306, the (XYZ) piezo scanner 1002, or a combination thereof can be removably coupled for replacement, interchange, servicing, or a combination thereof. For example, the (XYZ) piezo scanner 1002 is only for lateral stick-slip motion, and the shear piezo actuator 412 is for vertical stick-slip motion. As an example, the removable probe 306 can include a chip carrier including a cantilever, a tip, or a combination thereof. For example, in an SPM (AFM) system, the sample 110 is attached to the sample disk 420 by an attachment including glue, tape, or any other adhesive or attachment method.

In an upper portion of the detachable head 904, a probe holder 1102 can be arranged to receive the removable probe 306. The probe holder 1102 can be removably mounted on the detachable head 904 so that the removable probe 306 can be installed into or removed from the detachable head 904. The detachable head 904 can define a probe location 1104, which can correspond to a position at which the removable probe 306 is supported relative to a sample-side region for probe-sample interaction. In the illustrated example, the probe location 1104 can be positioned above the sample disk 420. The (XYZ) piezo scanner 1002 can be positioned below the sample disk 420 within the detachable head 904. The probe holder 1102 can receive the removable probe 306 and place the removable probe 306 at the probe location 1104, while the sample disk 420 and the (XYZ) piezo scanner 1002 can provide a sample-side region positioned relative to the probe location 1104.

For illustration purposes, the sample disk 420, the removable probe 306, the (XYZ) piezo scanner 1002, and the detachable head 904 are shown as separate components, although it is understood that the components can be implemented in a different manner. For example, the sample disk 420, the removable probe 306, the (XYZ) piezo scanner 1002, or a combination thereof can be integrated into the detachable head 904.

Figure 12:
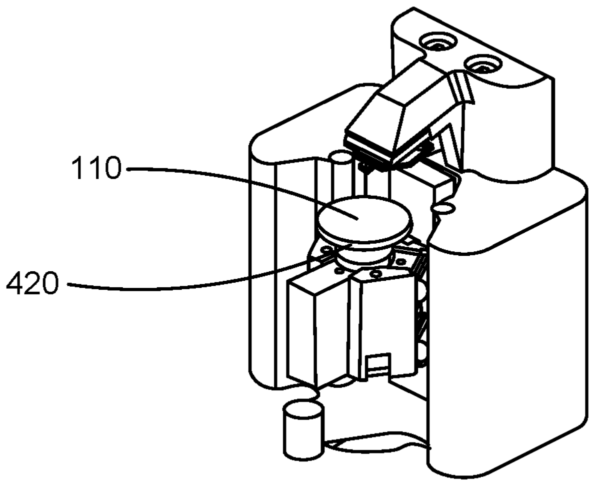
FIG. 12 is a configuration example of the sample disk disposed on the tube piezo.

Referring now to FIG. 12, therein is shown a configuration example of the sample disk 420 disposed on the tube piezo 414. The sample 110 can be attached to the sample disk 420 so the sample 110 can be translated or moved together with the sample disk 420 during positioning. The sample disk 420 can be attached to the tube piezo 414 of FIG. 4 by a magnetic force, and motion of the tube piezo 414 can be transmitted through the sample disk 420 to the sample 110. Compared with FIG. 11, which can more generally depict the sample disk 420 as spaced from the scanner arrangement, FIG. 12 can more directly illustrate the sample disk 420 as mounted on and supported by the tube piezo 414.

Figure 13:
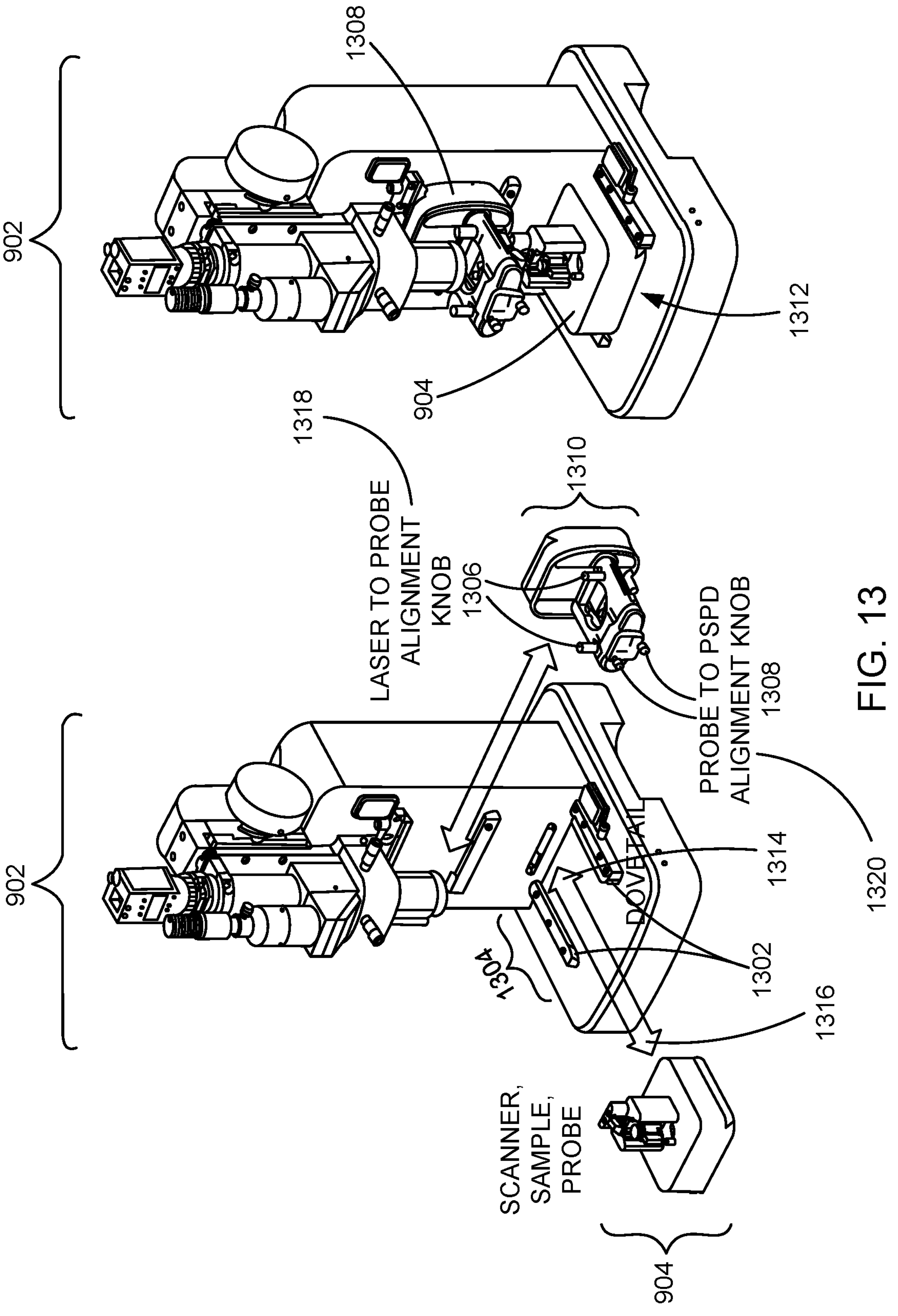
FIG. 13 is a configuration example of the detachable head mounted on the structural assembly.

Referring now to FIG. 13, therein is shown an example of the detachable head 904 mounted on the structural assembly 902. In the left-side exploded arrangement, the detachable head 904 can be shown spaced from a lower receiving region of the structural assembly 902. An alignment interface 1302 can be defined between the structural assembly 902 and the detachable head 904. For example, the alignment interface 1302 can include a dovetail interface, magnetic attachment, or another mating interface configured to repeatably position the detachable head 904 after remounting.

The structural assembly 902 can include a head-attachment structure 1304. The head-attachment structure 1304 can include one or more guide surfaces, rails, grooves, channels, or other attachment features that guide insertion of and removal of the detachable head 904 relative to the structural assembly 902. In the illustrated example, the head-attachment structure 1304 can include the alignment interface 1302 on opposing sides of the structural assembly 902 so that the detachable head 904 can be advanced along a guided path into an installed position and withdrawn along a reverse path for removal. The guided mounting arrangement can thereby position the removable probe 306 of FIG. 3 relative to the structural assembly 902 in a repeatable manner upon reinstallation.

A first optical alignment adjuster 1306 and a second optical alignment adjuster 1308 can be positioned on an optical alignment portion coupled to the structural assembly 902. The first optical alignment adjuster 1306 can include a manually actuatable knob configured to adjust a laser-to-probe alignment between the laser 702 of FIG. 7 and the removable probe 306. The second optical alignment adjuster 1308 can include a manually actuatable knob configured to adjust a probe-to-photodetector alignment between the removable probe 306 and the position-sensitive photodetector 704 of FIG. 7. For example, an operation of the first optical alignment adjuster 1306 and the second optical alignment adjuster 1308 can facilitate alignment of an optical path after the detachable head 904 is mounted on the structural assembly 902.

At a right side of the left-side exploded arrangement, an alignment module 1310 can be shown spaced from a side-mount region of the structural assembly 902. By way of an example, the alignment module 1310 is a removable module positioned at a side of the structural assembly 902 that can include alignment controls for an incident beam path and a return beam path relative to the detachable head 904. As an example, it is easy to exchange samples, probes, scanners and to align a laser beam.

On the alignment module 1310, the first optical alignment adjuster 1306 can be shown at an upper portion of the alignment module 1310 and the second optical alignment adjuster 1308 can be shown at a lower portion of the alignment module 1310. The first optical alignment adjuster 1306 is a manually rotatable adjustment member of the alignment module 1310 that can adjust a laser beam relative to a probe-side region of the detachable head 904. The second optical alignment adjuster 1308 is a manually rotatable adjustment member of the alignment module 1310 that can adjust a reflected beam path relative to a position-sensitive photodetector-side region. In the right-side assembled arrangement, the detachable head 904 and the alignment module 1310 can be mounted to the structural assembly 902 showing separate handling of the removable head and separate access to the two alignment knobs. The detachable head 904 can be removed from and remounted on the structural assembly 902 through the alignment interface 1302 to facilitate exchange of the removable probe 306, the sample disk 420 of FIG. 4, the (XYZ) piezo scanner 1002 of FIG. 10, or a combination thereof, and the first optical alignment adjuster 1306 and the second optical alignment adjuster 1308 can facilitate subsequent laser alignment.

For example, a position 1312 is a repeatable installed position of the detachable head 904 relative to the structural assembly 902 established by the alignment interface 1302 after remounting. The position 1312 can be a position at which the probe location 1104 of FIG. 11 can occupy a repeatable location relative to the structural assembly 902 for optical beam-deflection sensing. For example, an insertion 1314 is movement of the detachable head 904 relative to the structural assembly 902 along the head-attachment structure 1304 toward the position 1312, and a removal 1316 is movement of the detachable head 904 relative to the structural assembly 902 along the head-attachment structure 1304 away from the position 1312.

For example, a laser-to-probe alignment 1318 is an alignment relationship between the light beam 712 and the removable probe 306, and a probe-to-photodetector alignment 1320 is an alignment relationship between the removable probe 306 and the position-sensitive photodetector 704 for directing the light beam 712 reflected to the position-sensitive photodetector 704. The first optical alignment adjuster 1306 is configured to adjust the laser-to-probe alignment 1318, and the second optical alignment adjuster 1308 is configured to adjust the probe-to-photodetector alignment 1320.

It has been discovered that removably mounting the detachable head 904 on the structural assembly 902 through the alignment interface 1302 and the head-attachment structure 1304, together with providing the first optical alignment adjuster 1306 and the second optical alignment adjuster 1308 on the alignment module 1310, can simplify exchange of the removable probe 306, the sample disk 420, and the piezo scanner 1002 while also simplifying restoration of optical alignment after remounting. As a result, servicing, setup, and repeatable reinstallation can be improved without rebuilding the larger instrument structure. The optical beam-deflection subsystem 906 of FIG. 9 can include the laser 702, the steering mirror 706 of FIG. 7, the position-sensitive photodetector 704, the alignment module 1310 including the first optical alignment adjuster 1306 and the second optical alignment adjuster 1308, or a combination thereof.

Figure 14:
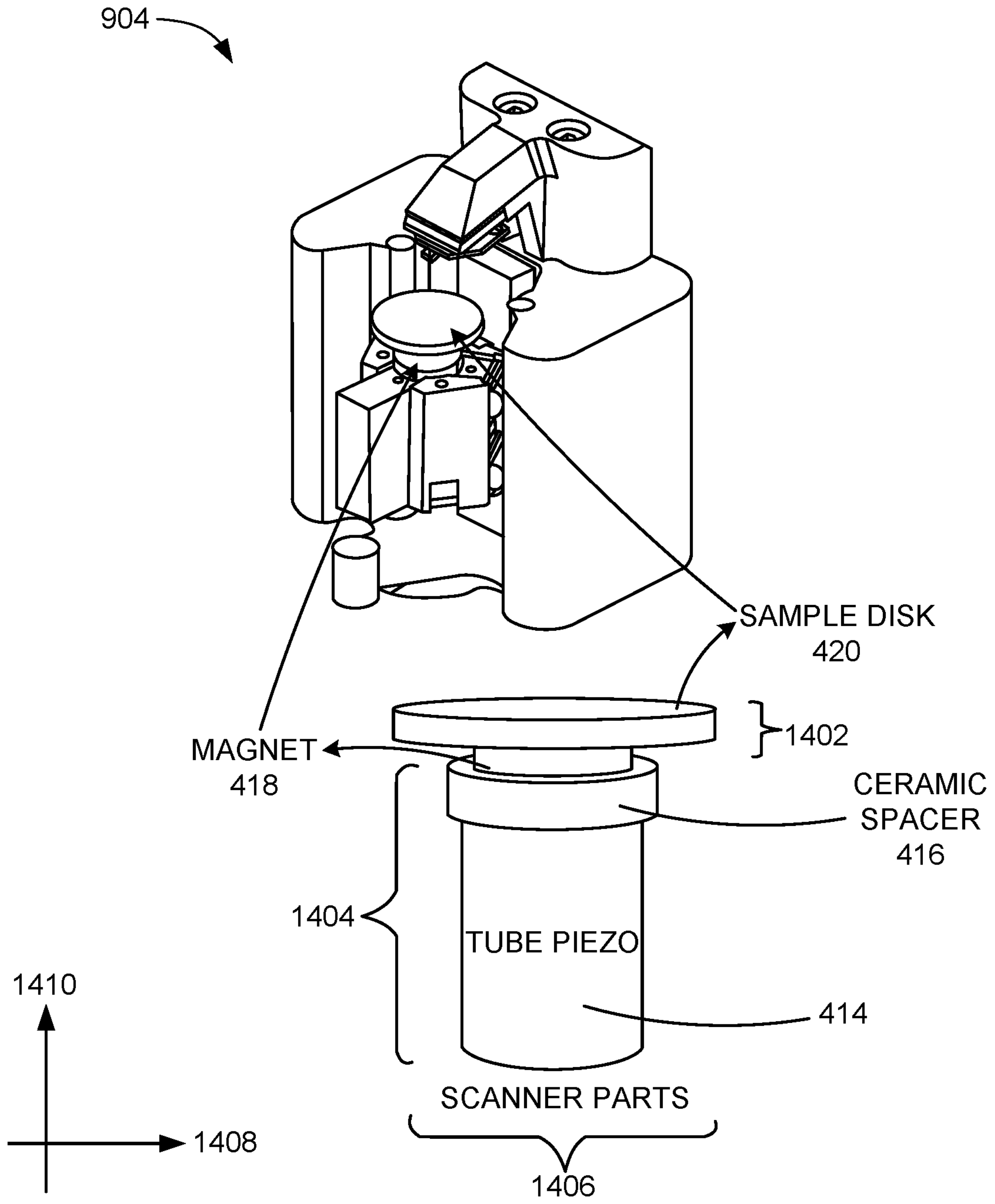
FIG. 14 is an example of a detailed view of the detachable head.

Referring now to FIG. 14, therein is shown an example of a detailed view of the detachable head 904. In a lower portion of FIG. 14, the tube piezo 414 can be shown as a lower component of an exploded sample-side stack, the spacer 416 can be positioned on the tube piezo 414, the sample-attachment structure 418 can be positioned above the spacer 416, and the sample disk 420 can be positioned above the sample-attachment structure 418. For example, the sample-side stack can support lateral (XY) stick-slip motion using the tube piezo 414. For example, the sample disk 420 is attached to the tube piezo 414 by magnetic force. The sample disk 420 and the tube piezo 414 can be attached to each other through the sample-attachment structure 418. For example, a stick-slip actuation of the tube piezo 414 can move the sample disk 420 in an X direction or a Y direction, and the exploded stack can illustrate a laterally movable sample-support stack in which the sample disk 420 can remain removably attached while the tube piezo 414 is actuated.

In an upper portion of FIG. 14, the detachable head 904 can be shown receiving the sample-side stack in an installed state beneath a probe-side region of the detachable head 904. A sample stage 1402 can include the installed sample-support arrangement received by the detachable head 904, and the sample stage 1402 can include the sample disk 420 and associated attachment structure beneath the sample disk 420. By way of an example, the sample stage 1402 is a removable sample-side stage that can be inserted into or otherwise received by the detachable head 904. An actuator 1404 can be arranged below the sample stage 1402 to move the sample stage 1402, and the tube piezo 414 shown in the exploded view can provide at least one implementation of the actuator 1404. By way of an example, the actuator 1404 is a scanner-side actuation structure that can include the tube piezo 414 and can, where the sample-side stack is supported on an underlying stick-slip stage, further include the shear piezo actuator 412, or a combination thereof to move the sample stage 1402 in a lateral direction, a vertical direction, or a combination thereof. A scanner assembly 1406 can be defined by the sample stage 1402 and the actuator 1404 within the detachable head 904. By way of an example, the scanner assembly 1406 is a sample-side scanner arrangement received by the detachable head 904 and can position the sample stage 1402 relative to a probe-side region.

For example, the detachable head 904 can receive or support the scanner assembly 1406 that can include the sample stage 1402 and the actuator 1404 so that the mechanical loop 612 of FIG. 6 between the removable probe 306 of FIG. 3 and the sample stage 1402 can be reduced. The detachable head 904 can support replacement, interchange, or servicing of the scanner assembly 1406, the probe holder 1102 of FIG. 11, and the sample stage 1402. The detachable head 904 can be removably mounted on the structural assembly 902 of FIG. 9 through the alignment interface 1302 of FIG. 13, which can include a dovetail interface, a magnetic attachment, or another mating interface, so that the detachable head 904 can be repeatably positioned relative to the structural assembly 902 after remounting. The laser 702 of FIG. 7, the position-sensitive photodetector 704 of FIG. 7, and the steering mirror 706 of FIG. 7 can be supported by the structural assembly 902 separately from the scanner assembly 1406, and the alignment module 1310 of FIG. 13 can include the first optical alignment adjuster 1306 of FIG. 13 and the second optical alignment adjuster 1308 of FIG. 13 to adjust a beam from the laser 702 relative to the removable probe 306 and to adjust a reflected beam path from the removable probe 306 relative to the position-sensitive photodetector 704. The scanner assembly 1406 can provide fine positioning of the sample stage 1402, and the actuator 1404 can provide larger-range positioning of the sample stage 1402 by stick-slip actuation of the tube piezo 414 or the shear piezo actuator 412.

The optical beam-deflection subsystem 906 of FIG. 9 can include the laser 702, the steering mirror 706, and the position-sensitive photodetector 704, and can be supported by the structural assembly 902 separately from the scanner assembly 1406. The alignment interface 1302 can position the detachable head 904 after remounting so that the probe location 1104 of FIG. 11 occupies a repeatable position at which the light beam 712 of FIG. 7 from the optical beam-deflection subsystem 906 is directed to the removable probe 306 and the light beam 712 reflected from the removable probe 306 is directed to the position-sensitive photodetector 704. For example, a lateral direction 1408 is a direction along which the actuator 1404 can move the sample stage 1402 for lateral positioning relative to the removable probe 306, and a vertical direction 1410 is a direction along which the actuator 1404 can move the sample stage 1402 for vertical positioning relative to the removable probe 306.

Figure 15:
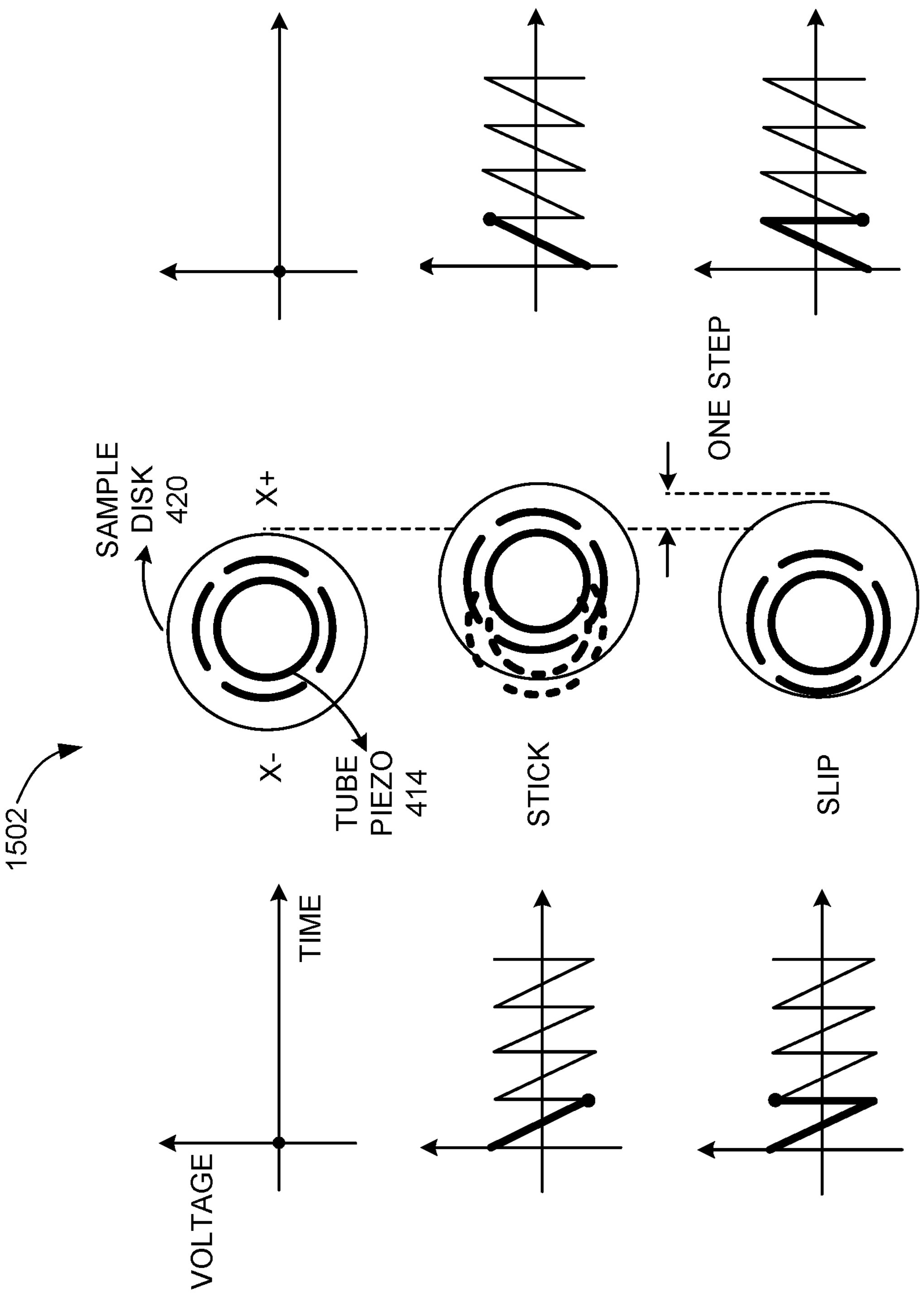
FIG. 15 is a plot example of an operation of the tube piezo for lateral stick-slip motion.

Referring now to FIG. 15, therein is shown a plot example of an operation of the tube piezo 414 for lateral stick-slip motion. The plot example illustrates the opposite upper-left and upper-right waveform axes in which the tube piezo 414 can be shown as a circular actuator with X− and X+ directions indicated on opposite sides. The tube piezo 414 can include a piezoelectric tube actuator that can be driven with an asymmetric voltage-versus-time waveform for lateral stick-slip motion. Over the tube piezo 414, the sample disk 420 can be shown concentrically in the upper central view. For example, the sample disk 420 can include a disk-shaped sample support that can be attached to the tube piezo 414 by a magnetic force. For example, a lateral (XY) stick-slip motion can be implemented using a tube scanner (e.g., the tube piezo 414). For example, the tube piezo 414 can include a number of functions. As an example, a first function includes a fine positioning operation within a scan range, and a second function includes a lateral stick-slip motion operation in a specified range. For a specific example, the fine positioning operation can be performed within the scan range of approximately 3 μm×3 μm×1 μm or any other scan range, and the lateral stick-slip motion operation can be performed in a range greater than approximately 3 μm or any other range.

Below the upper central view, middle and lower central views can illustrate successive stick and slip conditions of a coarse positioning mechanism 1502, and left-side and right-side waveform plots can show opposite-polarity drive sequences that can correspond to motion toward X− or X+. By way of an example, the coarse positioning mechanism 1502 is a lateral positioning mechanism that can translate or move a sample-side portion over a displacement range greater than a fine-positioning range by stick-slip operation of the tube piezo 414. The waveform sequences can depict an asymmetric voltage-versus-time drive in which a slower-change portion can correspond to stick and a faster-change portion can correspond to slip. A dashed vertical guide and an opposed-arrow labeled "ONE STEP" indicator can identify a one-step lateral displacement between successive positions of the sample disk 420. For example, the illustrated progression from the upper position to the middle and lower positions corresponds to stick-slip motion of the tube piezo 414 and the sample disk 420 moves in a lateral (X or Y) direction. The coarse positioning mechanism 1502 can provide automatic lateral alignment of the sample 110 of FIG. 1 by stick-slip operation of the tube piezo 414 to move the sample disk 420 in a lateral (X or Y) direction.

It has been discovered that coupling the sample disk 420 to the tube piezo 414 through the sample-attachment structure 418 of FIG. 4 and operating the coarse positioning mechanism 1502 by stick-slip motion of the tube piezo 414 can move the sample 110 in an X direction or a Y direction for coarse alignment while keeping the sample disk 420 in a compact sample-side stack. As a result, automatic sample-side alignment can be integrated into the detachable-head architecture without relying on a larger remote XY stage arrangement.

Figure 16:
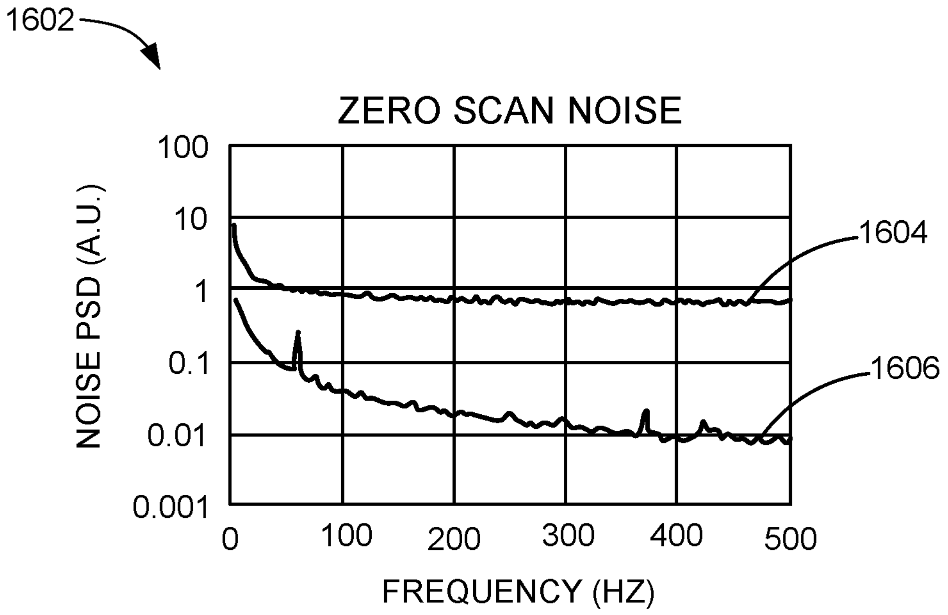
FIG. 16 is a first example of a zero scan noise plot.

Referring now to FIG. 16, therein is shown a first example of a zero scan noise plot. For example, zero scan noise refers to a root-mean-square (RMS) variation of a vertical displacement signal of the scanner measured over time under a no-scan condition, where lateral scanning control signals are held zero and a feedback loop controlling probe-sample interaction is engaged. The first example illustrates a zero scan noise plot 1602, which presents noise power spectral density (PSD) versus frequency for different microscope implementations. For example, the zero scan noise plot 1602 can include a horizontal axis labeled FREQUENCY (HZ) and a vertical axis labeled NOISE PSD (A.U.), where "A.U." refers to arbitrary units representing relative power spectral density. In an upper portion of the zero scan noise plot 1602, an upper comparison trace 1604 can descend steeply at lower frequency and can then continue across the plotted range at a comparatively higher noise level. For example, the upper comparison trace 1604 is a first plotted noise spectrum for another microscope implementation used for comparison.

Below the upper comparison trace 1604, a lower comparison trace 1606 can extend across the same plotting region and can remain at a lower level over the depicted frequency range. For example, the lower comparison trace 1606 is a second plotted noise spectrum for a microscope implementation in an embodiment of the present invention. The relative separation between the upper comparison trace 1604 and the lower comparison trace 1606 can visually indicate that the embodiment of the present invention can maintain lower zero scan noise power spectral density than the comparison implementation over the depicted frequency range.

For example, under the same Z Gain setting of 0.01, an embodiment of the present invention can show a zero-scan-noise Rq of approximately 0.02 Å, whereas the comparison implementation can show approximately 0.24 Å, where Rq is root mean square roughness and Å is angstrom. An embodiment of the present invention can also show lateral noise of approximately 0.04 Å, corresponding to approximately 0.25 mV, whereas the comparison implementation can show approximately 1.4 Å, where mV is millivolt. In addition, an embodiment of the present invention can show electrical background noise of approximately 0.2 mV. The comparison can indicate that the embodiment can provide approximately 10 times lower zero-scan noise and approximately 30 times lower lateral noise, with the lateral noise described as being affected by electrical noise rather than by lateral motion.

Figure 17:
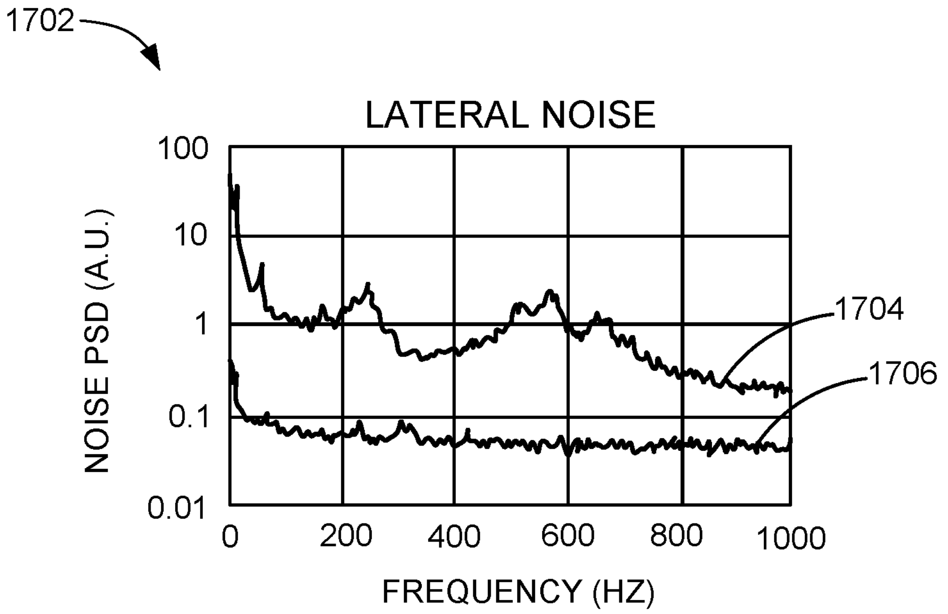
FIG. 17 is a first example of a lateral noise plot.

Referring now to FIG. 17, therein is shown a first example of a lateral noise plot. For example, lateral noise refers to a root-mean-square (RMS) variation of lateral displacement of the removable probe 306 relative to the sample 110 over time under a no-scan condition, where lateral scanning control signals are held zero and a feedback loop controlling probe-sample interaction is engaged. The first example illustrates a lateral noise plot 1702 that can present a lateral-noise comparison as noise power spectral density versus frequency. For example, the lateral noise plot 1702 is a comparative graph that can present noise power spectral density (PSD) for different microscope implementations during a lateral-noise measurement. The lateral noise plot 1702 can include a horizontal axis labeled FREQUENCY (HZ) and a vertical axis labeled NOISE PSD (A.U.), where "A.U." refers to arbitrary units representing relative power spectral density. In an upper portion of the lateral noise plot 1702, an upper comparison trace 1704 can begin at a comparatively high noise level near a lower-frequency region, can drop sharply from the left side of the plot, and can then continue across the frequency range with multiple local rises and falls at a level above another plotted spectrum described below. For example, the upper comparison trace 1704 is a first plotted lateral-noise spectrum that can represent a comparison microscope implementation.

Below the upper comparison trace 1704, the lateral noise plot 1702 can include a lower comparison trace 1706 that can remain at a lower noise level across the plotted frequency range and can show comparatively smaller fluctuations than the upper comparison trace 1704. For example, the lower comparison trace 1706 is a second plotted lateral-noise spectrum that can represent a microscope implementation in an embodiment of the present invention. The lower comparison trace 1706 can visually indicate lower plotted noise power spectral density than the upper comparison trace 1704 over the displayed frequency range.

Figure 18:
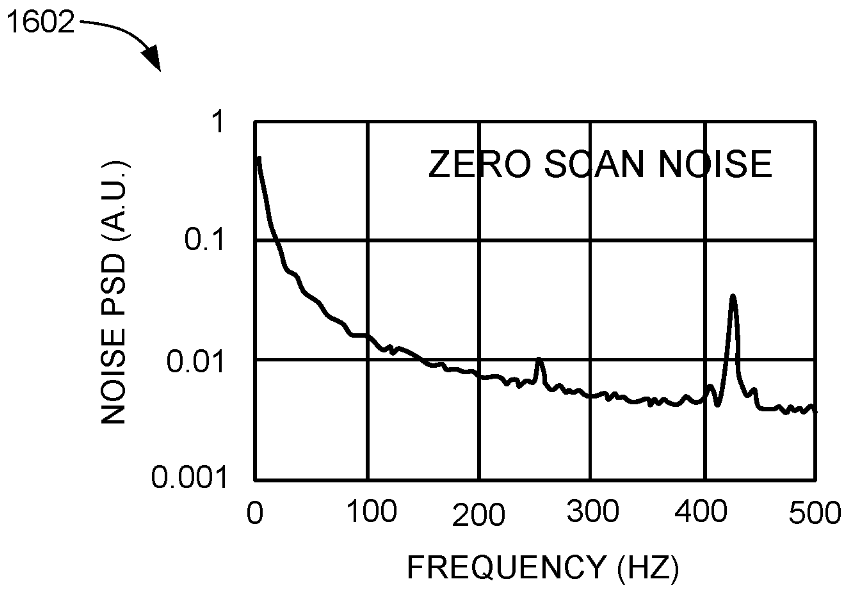
FIG. 18 is a second example of the zero scan noise plot.

Referring now to FIG. 18, therein is shown a second example of the zero scan noise plot 1602. The second example illustrates the zero scan noise plot 1602 presenting noise power spectral density as a function of frequency. In the illustrated example, a plotted noise spectrum can decrease as frequency increases. The plotted noise spectrum can also include a localized peak in a higher-frequency region near the right side of the zero scan noise plot 1602. The zero scan noise plot 1602 can convey how the noise spectrum varies over frequency.

Figure 19:
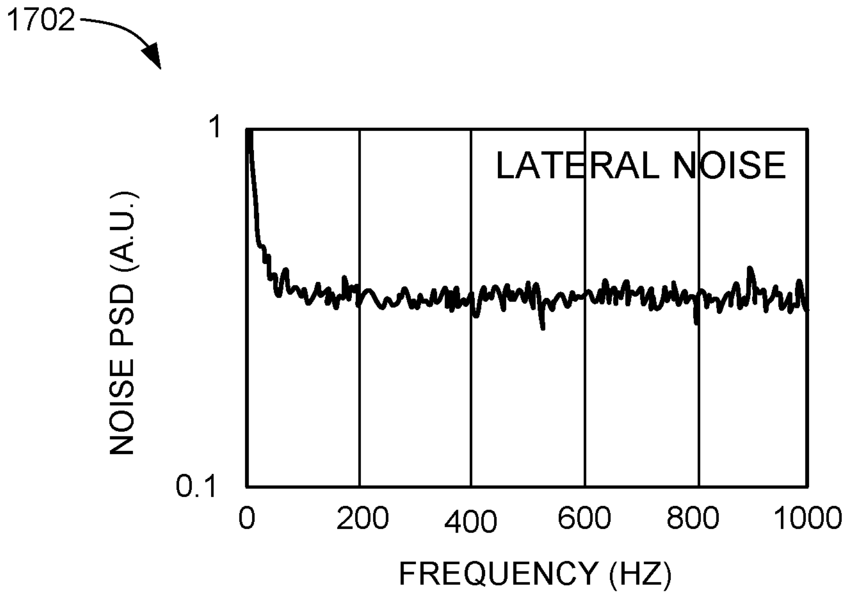
FIG. 19 is a second example of the lateral noise plot.

Referring now to FIG. 19, therein is shown a second example of the lateral noise plot1702. The second example illustrates the lateral noise plot 1702 presenting a lateral-noise spectrum as noise power spectral density versus frequency. The plotted spectrum within the lateral noise plot 1702 can begin at a comparatively higher value near a low-frequency end of the horizontal axis and can then decrease over an initial portion of the frequency range before remaining comparatively flatter through a higher-frequency portion of the frequency range.

For a specific example, the zero-scan-noise measurement can use a bare-silicon sample, an NCHR cantilever model, contact mode, a 1 micronewton set point, a Z-axis gain of 0.01, a scan rate of 2 hertz, and a data size of 256×256. The lateral-noise measurement can use the same bare-silicon sample in contact mode with a B100-NCH cantilever model, a 1.5 micronewton set point, a Z-axis gain of 0.05, a scan rate of 2 hertz, and a data size of 512×128. For zero-scan noise comparison, 0.2 angstrom is measured with a comparison system and 0.02 angstrom is measured with an embodiment of the present invention, and lateral noise of 1.4 angstrom is measured with a comparison system versus 0.116 angstrom is measured with an embodiment of the present invention. For lateral noise comparison, sensitivity of 112 millivolts per nanometer is measured with a comparison system versus 30.6 millivolts per nanometer is measured with an embodiment of the present invention, an Rq root-mean-square value at approach of 16 millivolts is measured with a comparison system versus 0.354 millivolt is measured with an embodiment of the present invention, and an Rq root-mean-square value in air of 0.344 millivolt is measured with an embodiment of the present invention.

The zero-scan noise of an embodiment of the present invention is ten times lower than for the comparison system, and lateral noise of an embodiment of the present invention is twelve times lower than for the comparison system. Here, Bare-Si means bare silicon, μN means micronewton, Hz means hertz, mV means millivolt, nm means nanometer, Å means angstrom, and Z refers to the vertical axis. NCHR and B100-NCH can be understood as cantilever model designations.

It has been discovered that the compact arrangement defined by the mechanical loop 612 of FIG. 6, the detachable head 904 of FIG. 9, the scanner assembly 1406 of FIG. 14, and the optical beam-deflection subsystem 906 of FIG. 9 can correspond to a lower noise spectrum in the zero scan noise plot 1602 of FIG. 16 and the lateral noise plot 1702 than a comparison implementation. As a result, the compact modular architecture can support lower zero-scan noise and lateral noise and can support high-resolution measurement in which lateral noise is described as being affected by electrical noise rather than by lateral motion.

Figure 20:
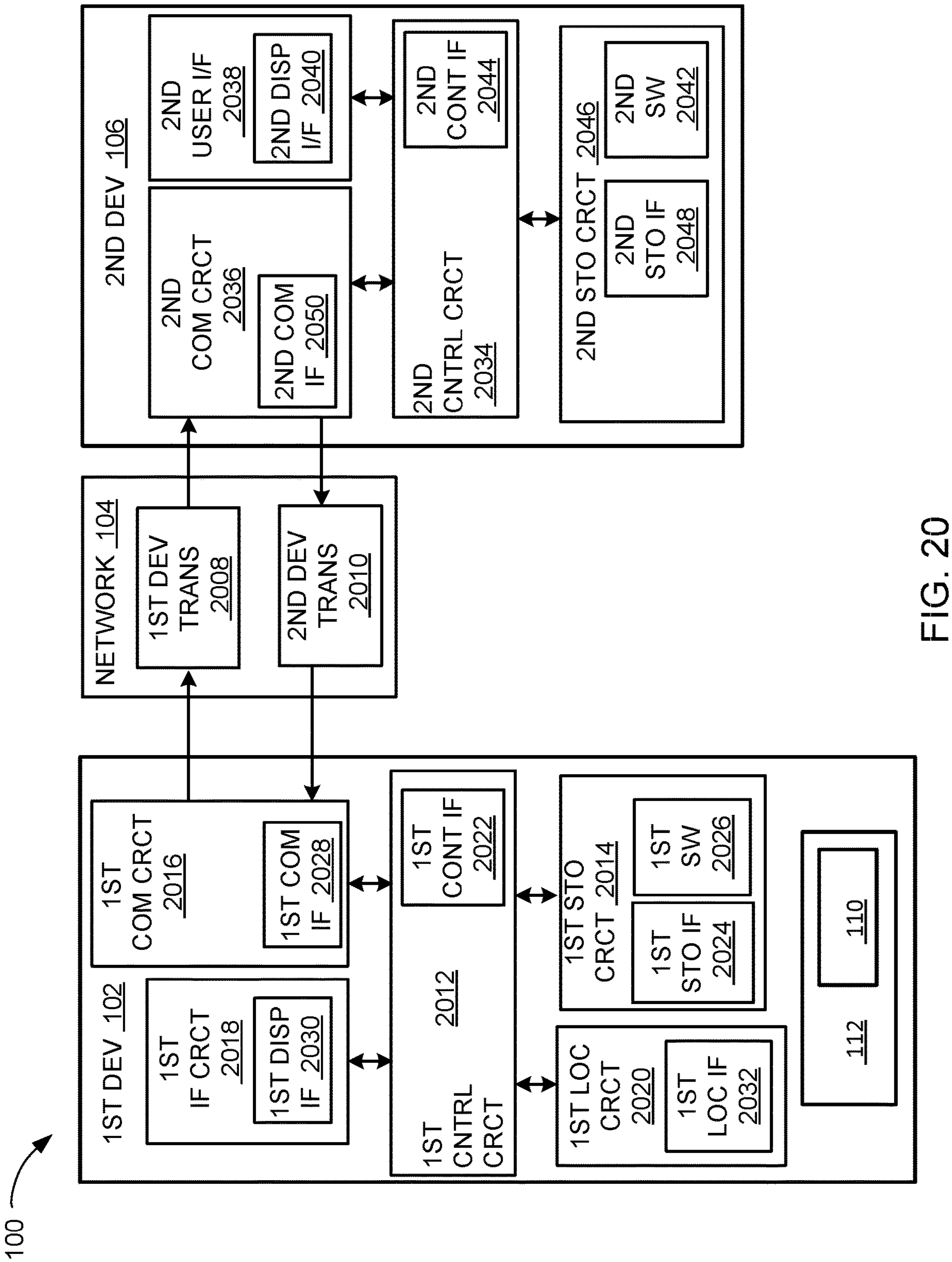
FIG. 20 is an exemplary block diagram of the measurement system in an embodiment.

Referring now to FIG. 20, therein is shown an exemplary block diagram of the measurement system 100 in an embodiment. The measurement system 100, a portion of the measurement system 100, or a combination thereof can execute the detection mechanism 112 of FIG. 1. The measurement system 100 can include the first device 102, the network 104, and the second device 106. The first device 102 can send information in a first device transmission 2008 over the network 104 to the second device 106. The second device 106 can send information in a second device transmission 2010 over the network 104 to the first device 102. For example, the measurement system 100 can be a compact scanning probe microscope system including a scanner module configured to provide fine positioning, the coarse positioning mechanism 1502 of FIG. 15 configured to provide a larger-range translation, an optical detection subsystem configured to detect a response of the probe 708 of FIG. 7, and a detachable interface supporting modular replacement of a scanner module, a probe assembly, the sample stage 1402 of FIG. 14, or a combination thereof. For example, the measurement system 100 can correspond to a compact modular scanning probe microscope system in which fine positioning, larger-range translation, probe-response detection, or a combination thereof can be coordinated in a modular instrument architecture.

For illustrative purposes, the measurement system 100 is shown with the first device 102 as a client device, although it is understood that the measurement system 100 can include the first device 102 as a different type of device. For example, the interaction between the first device 102 and the second device 106 can support distributed control, data handling, display, storage, or a combination thereof for the measurement system 100.

Also, for illustrative purposes, the measurement system 100 is shown with the second device 106 as a server, although it is understood that the measurement system 100 can include the second device 106 as a different type of device. For example, the second device 106 can be a client device. By way of an example, the measurement system 100 can be implemented entirely on the first device 102 with some functions of the detection mechanism 112 executed by a first control circuit 2012.

Also, for illustrative purposes, the measurement system 100 is shown with interaction between the first device 102 and the second device 106. Similarly, the second device 106 can similarly interact with the first device 102 representing the tablet computer, the smart phone, or a combination thereof. For example, the measurement system 100 can operate an atomic force microscope (AFM). For example, the interaction between the first device 102 and the second device 106 can support handling of scan settings, measurement data, image data, noise data, or a combination thereof associated with AFM operation.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include the first control circuit 2012, a first storage circuit 2014, a first communication circuit 2016, a first interface circuit 2018, and a first location circuit 2020. The first control circuit 2012 can include a first control interface 2022. The first control circuit 2012 can execute a first software 2026 to provide the intelligence of the measurement system 100. For example, the first control circuit 2012 can control at least a portion of the scanner module, the coarse positioning mechanism, the optical detection subsystem, or a combination thereof of the measurement system 100. For example, the first control circuit 2012 can coordinate scan-related operation, measurement data handling, or a combination thereof for the measurement system 100.

The first control circuit 2012 can be implemented in a number of different manners. For example, the first control circuit 2012 can be a processor, an application specific integrated circuit (ASIC), an embedded processor, a microprocessor, a hardware control logic, a hardware finite state machine (FSM), a digital signal processor (DSP), or a combination thereof. The first control interface 2022 can be used for communication between the first control circuit 2012 and other functional units or circuits in the first device 102. The first control interface 2022 can also be used for communication that is external to the first device 102. The first control circuit 2012 can process information associated with the sample 110 and execute portions of the detection mechanism 112. For example, the processed information can include scan parameters, measurement results, image data, noise data, or a combination thereof associated with the sample 110.

The first control interface 2022 can receive information from the other functional units/circuits or from external sources, or can transmit information to the other functional units/circuits or to external destinations. The external sources and the external destinations refer to sources and destinations external to the first device 102.

The first control interface 2022 can be implemented in different ways and can include different implementations depending on which functional units/circuits or external units/circuits are being interfaced with the first control interface 2022. For example, the first control interface 2022 can be implemented with a pressure sensor, an inertial sensor, a microelectromechanical system (MEMS), optical circuitry, waveguides, wireless circuitry, wireline circuitry, cantilever deflection sensor, piezoelectric scanner control, microwave circuitry, or a combination thereof.

The first storage circuit 2014 can store the first software 2026. The first storage circuit 2014 can also store the relevant information, such as data representing incoming samples 110, the detection mechanism 112 and the other embodiments, or a combination thereof. For example, the relevant information can include measurement data associated with the sample 110, operating parameters, image data, noise data, or a combination thereof.

The first storage circuit 2014 can be a volatile memory, a nonvolatile memory, an internal memory, an external memory, or a combination thereof. For example, the first storage circuit 2014 can be a nonvolatile storage such as non-volatile random-access memory (NVRAM), Flash memory, disk storage, or a volatile storage such as static random-access memory (SRAM).

The first storage circuit 2014 can include a first storage interface 2024. The first storage interface 2024 can be used for communication between the first storage circuit 2014 and other functional units or circuits in the first device 102. The first storage interface 2024 can also be used for communication that is external to the first device 102.

The first storage interface 2024 can receive information from the other functional units/circuits or from external sources, or can transmit information to the other functional units/circuits or to external destinations. The external sources and the external destinations refer to sources and destinations external to the first device 102. The first storage interface 2024 can receive input from and source data to the detection mechanism 112.

The first storage interface 2024 can include different implementations depending on which functional units/circuits or external units/circuits are being interfaced with the first storage circuit 2014. The first storage interface 2024 can be implemented with technologies and techniques similar to the implementation of the first control interface 2022. The first storage circuit 2014 can store AFM height data or combined datasets for later analysis or calibration. For example, the first storage circuit 2014 can store zero scan noise data, lateral noise data, atomic lattice image data, calibration data, or a combination thereof.

The first communication circuit 2016 can enable external communication to and from the first device 102. For example, the first communication circuit 2016 can permit the first device 102 to communicate with the second device 106 and the network 104. The first communication circuit 2016 can interact with the second device 106 for implementing the detection mechanism 112. For example, the first communication circuit 2016 can communicate scan settings, measurement data, processed results, or a combination thereof between the first device 102 and the second device 106.

The first communication circuit 2016 can also function as a communication hub allowing the first device 102 to function as part of the network 104 and not limited to be an endpoint or terminal circuit to the network 104. The first communication circuit 2016 can include active and passive components, such as microelectronics or an antenna, for interaction with the network 104. The first communication circuit 2016 can relay real-time AFM tip-position and signal data to the second device 106 for image formation.

The first communication circuit 2016 can include a first communication interface 2028. The first communication interface 2028 can be used for communication between the first communication circuit 2016 and other functional units or circuits in the first device 102. The first communication interface 2028 can receive information from the second device 106 for distribution to the other functional units/circuits or can transmit information to the other functional units or circuits.

The first communication interface 2028 can include different implementations depending on which functional units or circuits are being interfaced with the first communication circuit 2016. The first communication interface 2028 can be implemented with technologies and techniques similar to the implementation of the first control interface 2022.

The first interface circuit 2018 allows the user 108 of FIG. 1 to interface and interact with the first device 102. The first interface circuit 2018 can include an input device and an output device. Examples of the input device of the first interface circuit 2018 can include a keypad, a touchpad, soft-keys, a keyboard, a microphone, a camera, an infrared sensor for receiving remote signals, or any combination thereof to provide data and communication inputs, such as the sample 110. The first interface circuit 2018 can receive the sample 110 provided by the user 108 that can be manipulated by the first control circuit 2012. The first interface circuit 2018 can allow the user 108 to select scan regions, adjust probe-sample distance, and display amplitude. For example, the first interface circuit 2018 can present scan settings, image data, noise data, alignment-related information, or a combination thereof to the user 108.

The first interface circuit 2018 can include a first display interface 2030. The first display interface 2030 can include an output device. The first display interface 2030 can include a projector, a video screen, a touch screen, a speaker, a microphone, a keyboard, and combinations thereof. The first display interface 2030 can allow the user 108 to view the results of the detection mechanism 112 and the other embodiments on the output device.

The first control circuit 2012 can operate the first interface circuit 2018 to display information generated by the measurement system 100 and receive input from the user 108. The first control circuit 2012 can also execute the first software 2026 for the other functions of the measurement system 100, including receiving location information from the first location circuit 2020. The first control circuit 2012 can further execute the first software 2026 for interaction with the network 104 via the first communication circuit 2016. The first control circuit 2012 can operate portions or all of the detection mechanism 112.

The first control circuit 2012 can also receive location information from the first location circuit 2020. The first control circuit 2012 can operate the detection mechanism 112 or portions thereof. The first control circuit 2012 can operate on information associated with the sample 110, as well as any of the output for the detection mechanism 112 and any of the embodiments for display to the user 108.

The first location circuit 2020 can be implemented in many ways. For example, the first location circuit 2020 can function as at least a part of the global positioning system, an inertial compute system, a cellular-tower location system, a gyroscope, or any combination thereof. Also, for example, the first location circuit 2020 can utilize components such as an accelerometer, gyroscope, or global positioning system (GPS) receiver.

The first location circuit 2020 can include a first location interface 2032. The first location interface 2032 can be used for communication between the first location circuit 2020 and other functional units or circuits in the first device 102.

The first location interface 2032 can receive information from the other functional units/circuits or from external sources, or can transmit information to the other functional units/circuits or to external destinations. The external sources and the external destinations refer to sources and destinations external to the first device 102. The first location interface 2032 can receive the global positioning location from the global positioning system (not shown).

The first location interface 2032 can include different implementations depending on which functional units/circuits or external units/circuits are being interfaced with the first location circuit 2020. The first location interface 2032 can be implemented with technologies and techniques similar to the implementation of the first control circuit 2012.

The second device 106 can be optimized for implementing an embodiment of the present invention in a multiple device embodiment with the first device 102. The second device 106 can provide the additional or higher performance processing power compared to the first device 102. The second device 106 can include a second control circuit 2034, a second communication circuit 2036, a second user interface 2038, and a second storage circuit 2046.

The second user interface 2038 allows an operator (not shown) to interface and interact with the second device 106. The second user interface 2038 can include an input device and an output device. Examples of the input device of the second user interface 2038 can include a keypad, a touchpad, soft-keys, a keyboard, a microphone, or any combination thereof to provide data and communication inputs. Examples of the output device of the second user interface 2038 can include a second display interface 2040. The second display interface 2040 can include a display, a projector, a video screen, a speaker, or a combination thereof.

The second control circuit 2034 can execute a second software 2042 to provide the intelligence of the second device 106 of the measurement system 100. The second software 2042 can operate in conjunction with the first software 2026. The second control circuit 2034 can provide additional performance compared to the first control circuit 2012. The second control circuit 2034 can execute instructions to implement all or some of the functions of the detection mechanism 112.

The second control circuit 2034 can operate the second user interface 2038 to display information. The second control circuit 2034 can also execute the second software 2042 for the other functions of the measurement system 100, including operating the second communication circuit 2036 to communicate with the first device 102 over the network 104.

The second control circuit 2034 can be implemented in a number of different manners. For example, the second control circuit 2034 can be a processor, an embedded processor, a microprocessor, hardware control logic, a hardware finite state machine (FSM), a digital signal processor (DSP), or a combination thereof.

The second control circuit 2034 can include a second control interface 2044. The second control interface 2044 can be used for communication between the second control circuit 2034 and other functional units or circuits in the second device 106. The second control interface 2044 can also be used for communication that is external to the second device 106.

The second control interface 2044 can receive information from the other functional units/circuits or from external sources, or can transmit information to the other functional units/circuits or to external destinations. The external sources and the external destinations refer to sources and destinations external to the second device 106.

The second control interface 2044 can be implemented in different ways and can include different implementations depending on which functional units/circuits or external units/circuits are being interfaced with the second control interface 2044. For example, the second control interface 2044 can be implemented with a pressure sensor, an inertial sensor, a microelectromechanical system (MEMS), optical circuitry, waveguides, wireless circuitry, wireline circuitry, or a combination thereof.

The second storage circuit 2046 can store the second software 2042. The second storage circuit 2046 can also store the information such as data representing incoming sample 110, data representing, including but not limited to sound files, or a combination thereof. The second storage circuit 2046 can be sized to provide the additional storage capacity to supplement the first storage circuit 2014. For example, the stored information can include measurement data associated with the sample 110, operating parameters, image data, noise data, or a combination thereof.

For illustrative purposes, the second storage circuit 2046 is shown as a single element, although it is understood that the second storage circuit 2046 can be a distribution of storage elements. Also, for illustrative purposes, the measurement system 100 is shown with the second storage circuit 2046 as a single hierarchy storage system, although it is understood that the measurement system 100 can include the second storage circuit 2046 in a different configuration. For example, the second storage circuit 2046 can be formed with different storage technologies forming a memory hierarchal system including different levels of caching, main memory, rotating media, or off-line storage.

The second storage circuit 2046 can be a controller of a volatile memory, a nonvolatile memory, an internal memory, an external memory, or a combination thereof. For example, the second storage circuit 2046 can be a controller of a nonvolatile storage such as non-volatile random-access memory (NVRAM), Flash memory, disk storage, or a volatile storage such as static random access memory (SRAM). The second storage circuit 2046 can store AFM topography maps, amplitude data, and derived property maps including conductivity or permittivity. For example, the second storage circuit 2046 can store zero scan noise data, lateral noise data, atomic lattice image data, measurement results, or a combination thereof.

The second storage interface 2048 can receive information from the other functional units/circuits or from external sources, or can transmit information to the other functional units/circuits or to external destinations. The external sources and the external destinations refer to sources and destinations external to the second device 106.

The second storage interface 2048 can include different implementations depending on which functional units/circuits or external units/circuits are being interfaced with the second storage circuit 2046. The second storage interface 2048 can be implemented with technologies and techniques similar to the implementation of the second control interface 2044.

The second communication circuit 2036 can enable external communication to and from the second device 106. For example, the second communication circuit 2036 can permit the second device 106 to communicate with the first device 102 over the network 104.

The second communication circuit 2036 can also function as a communication hub allowing the second device 106 to function as part of the network 104 and not limited to be an endpoint or terminal unit or circuit to the network 104. The second communication circuit 2036 can include active and passive components, such as microelectronics or an antenna, for interaction with the network 104.

The second communication circuit 2036 can include a second communication interface 2050. The second communication interface 2050 can be used for communication between the second communication circuit 2036 and other functional units or circuits in the second device 106. The second communication interface 2050 can receive information from the other functional units/circuits or can transmit information to the other functional units or circuits.

The second communication interface 2050 can include different implementations depending on which functional units or circuits are being interfaced with the second communication circuit 2036. The second communication interface 2050 can be implemented with technologies and techniques similar to the implementation of the second control interface 2044. The second communication circuit 2036 can support remote microscope monitoring and cloud-based data processing for AFM imaging.

The second communication circuit 2036 can couple with the network 104 to send information to the first device 102. The first device 102 can receive information in the first communication circuit 2016 from the second device transmission 2010 of the network 104. The measurement system 100 can be executed by the first control circuit 2012, the second control circuit 2034, or a combination thereof. For illustrative purposes, the second device 106 is shown with the partition including the second user interface 2038, the second storage circuit 2046, the second control circuit 2034, and the second communication circuit 2036, although it is understood that the second device 106 can include a different partition. For example, the second software 2042 can be partitioned differently such that some or all of its function can be in the second control circuit 2034 and the second communication circuit 2036. Also, the second device 106 can include other functional units or circuits not shown in FIG. 20 for clarity.

The first storage circuit 2014 can include a non-transitory computer-readable medium storing instructions that, when executed by the control circuit 2012, can cause the control circuit 2012 to control, coordinate, prompt, sense, verify, or a combination thereof operations including the recited claim steps of the measurement system 100, or can cause the measurement system 100 to perform such operations. For example, such operations include receiving the removable probe 306 of FIG. 3 with the detachable head 904 of FIG. 9 defining the probe location 1104 of FIG. 11, removably mounting the detachable head 904 on the structural assembly 902 of FIG. 9 utilizing the alignment interface 1302 of FIG. 13, receiving the sample 110 of FIG. 1 with the sample stage 1402 of FIG. 14, moving the sample stage 1402 with the scanner assembly 1406 of FIG. 14 relative to the probe location 1104, attaching the optical beam-deflection subsystem 906 of FIG. 9, including the photodetector 704 of FIG. 7, to the structural assembly 902 separately from the scanner assembly 1406, and positioning the detachable head 904 after remounting so that the probe location 1104 occupies a position 1312 of FIG. 13 at which the light beam 712 of FIG. 7 is directed to the removable probe 306 and the light beam 712 reflected from the removable probe 306 is directed to the photodetector 704.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium including instructions for performing the software function of the detection mechanism 112, a portion therein, or a combination thereof.

For illustrative purposes, the measurement system 100 is described by operation of the first device 102 and the second device 106. It is understood that the first device 102 and the second device 106 can operate any of the modules or units and functions of the measurement system 100 including a distribution of the functions of the detection mechanism 112. For example, the modules or units include the AFM scanner control, excitation and detection electronics, the image-processing software, or a combination thereof.

Figure 21:
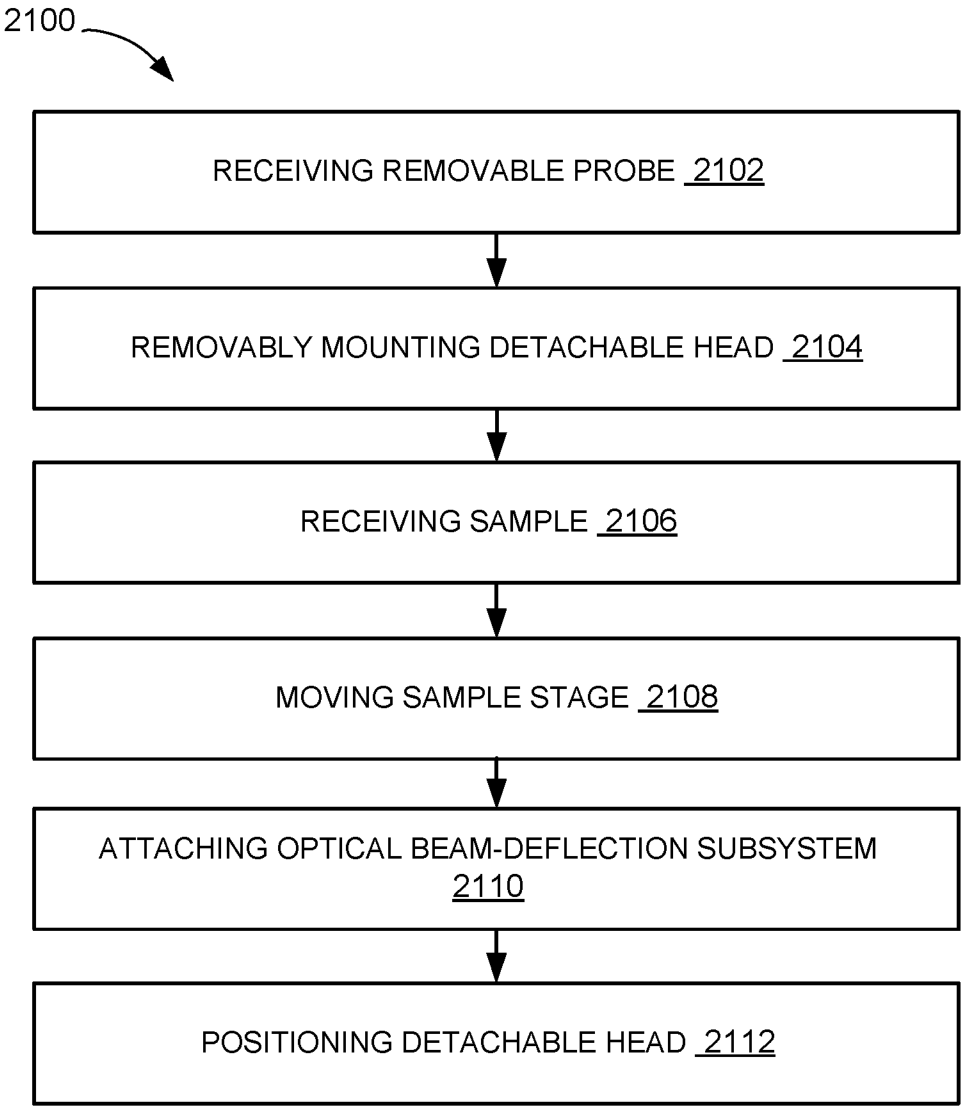
FIG. 21 is a flow chart of a method of operation of a measurement system in an embodiment of the present invention.

Referring now to FIG. 21, therein is shown a flow chart of a method 2100 of operation of a measurement system 100 of FIG. 1 in an embodiment of the present invention. The method 2100 includes: receiving a removable probe with a detachable head defining a probe location in a block 2102; removably mounting the detachable head on a structural assembly utilizing an alignment interface of the structural assembly in a block 2104; receiving a sample with a sample stage in a block 2106; moving the sample stage with a scanner assembly relative to the probe location in a block 2108; attaching an optical beam-deflection subsystem, including a photodetector, to the structural assembly and separate from the scanner assembly in a block 2110; and positioning the detachable head with the alignment interface after remounting to the structural assembly providing the probe location occupying a position at which a light beam from the optical beam-deflection subsystem is directed to the removable probe and the light beam reflected from the removable probe is directed to the photodetector in a block 2112.

One or more embodiments provide a compact modular scanning probe microscope, such as an atomic force microscope, in which a detachable head can support a scanner assembly and a sample stage within a shortened mechanical loop, where other beam-deflection AFMs can include a relatively long mechanical loop and can make atomic lattice imaging more difficult, and where the disclosed system can address easy exchange of a compact AFM scanner, sample, and probe together with decoupling of laser beam deflection from the scanner and automatic XY sample alignment. Instead of routing a mechanically relevant path through a larger beam-deflection architecture, the system can localize a probe-side region, the sample stage, and the scanner assembly in a detachable head removably mounted to a structural assembly through an alignment interface, while an optical beam-deflection subsystem can be supported separately from the scanner assembly and scanner, sample, and probe components can be removably coupled through dovetail or magnetic interfaces. With the compact arrangement, a scanner module can provide fine positioning, a coarse positioning mechanism using stick-slip motion with a tube piezo can provide larger-range positioning and X/Y sample adjustment, and the mechanical loop can be reduced to ~60 mm while the sample and probe region remains separated from laser components. As a result, low-noise and low-drift operation can be improved, exchange and servicing of scanner, sample, and probe components can be facilitated, laser alignment can be made easier, and atomic lattice images can be obtained more easily.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A measurement system comprising:

a structural assembly with an alignment interface;

a detachable head configured to receive a removable probe and defining a probe location and removably mounted on the structural assembly utilizing the alignment interface;

a sample stage configured to receive a sample;

a scanner assembly configured to move the sample stage relative to the probe location;

an optical beam-deflection subsystem, including a photodetector, attached to the structural assembly and separate from the scanner assembly; and wherein the alignment interface is configured to position the detachable head after remounting to the structural assembly providing the probe location occupying a position at which a light beam from the optical beam-deflection subsystem is directed to the removable probe and the light beam reflected from the removable probe is directed to the photodetector.

2. The measurement system as claimed in claim 1 wherein the sample stage is removably mounted on the detachable head.

3. The measurement system as claimed in claim 1 further comprising a probe holder configured to receive the removable probe and removably mounted on the detachable head.

4. The measurement system as claimed in claim 1 wherein:

the sample stage includes a sample disk configured to receive the sample; and the scanner assembly includes a sample-attachment structure attached to the sample disk.

5. The measurement system as claimed in claim 1 wherein the structural assembly includes a head-attachment structure configured to guide an insertion of and a removal of the detachable head relative to the structural assembly.

6. The measurement system as claimed in claim 1 wherein the scanner assembly includes an actuator configured to move the sample stage in a lateral direction and a vertical direction.

7. The measurement system as claimed in claim 1 wherein the optical beam-deflection subsystem includes:

a first optical alignment adjuster configured to adjust a laser-to-probe alignment between the light beam and the removable probe; and a second optical alignment adjuster configured to adjust a probe-to-photodetector alignment between the removable probe and the photodetector.

8. A method of operation of a measurement system comprising:

receiving a removable probe with a detachable head defining a probe location;

removably mounting the detachable head on a structural assembly utilizing an alignment interface of the structural assembly;

receiving a sample with a sample stage;

moving the sample stage with a scanner assembly relative to the probe location;

attaching an optical beam-deflection subsystem, including a photodetector, to the structural assembly and separate from the scanner assembly; and positioning the detachable head with the alignment interface after remounting to the structural assembly providing the probe location occupying a position at which a light beam from the optical beam-deflection subsystem is directed to the removable probe and the light beam reflected from the removable probe is directed to the photodetector.

9. The method as claimed in claim 8 further comprising removably mounting the sample stage on the detachable head.

10. The method as claimed in claim 8 further comprising:

receiving the removable probe with a probe holder; and removably mounting the probe holder on the detachable head.

11. The method as claimed in claim 8 further comprising:

attaching a sample-attachment structure to a sample disk;

wherein:

receiving the sample includes receiving the sample with the sample disk; and moving the sample stage includes moving the sample stage with the sample-attachment structure attached to the sample disk.

12. The method as claimed in claim 8 further comprising guiding an insertion of and a removal of the detachable head relative to the structural assembly with a head-attachment structure of the structural assembly.

13. The method as claimed in claim 8 further comprising moving the sample stage in a lateral direction and a vertical direction with an actuator of the scanner assembly.

14. The method as claimed in claim 8 further comprising:

adjusting a laser-to-probe alignment between the light beam and the removable probe with a first optical alignment adjuster of the optical beam-deflection subsystem; and adjusting a probe-to-photodetector alignment between the removable probe and the photodetector with a second optical alignment adjuster of the optical beam-deflection subsystem.

15. A non-transitory computer-readable medium storing an instruction that, when executed by a control circuit of a measurement system, causes the control circuit to perform functions comprising:

receiving a removable probe with a detachable head defining a probe location;

removably mounting the detachable head on a structural assembly utilizing an alignment interface of the structural assembly;

receiving a sample with a sample stage;

moving the sample stage with a scanner assembly relative to the probe location;

attaching an optical beam-deflection subsystem, including a photodetector, to the structural assembly and separate from the scanner assembly; and positioning the detachable head with the alignment interface after remounting to the structural assembly providing the probe location occupying a position at which a light beam from the optical beam-deflection subsystem is directed to the removable probe and the light beam reflected from the removable probe is directed to the photodetector.

16. The non-transitory computer-readable medium as claimed in claim 15 further comprising removably mounting the sample stage on the detachable head.

17. The non-transitory computer-readable medium as claimed in claim 15 further comprising:

receiving the removable probe with a probe holder; and removably mounting the probe holder on the detachable head.

18. The non-transitory computer-readable medium as claimed in claim 15 further comprising:

attaching a sample-attachment structure to a sample disk; wherein:

receiving the sample includes receiving the sample with the sample disk; and moving the sample stage includes moving the sample stage with the sample-attachment structure attached to the sample disk.

19. The non-transitory computer-readable medium as claimed in claim 15 further comprising guiding an insertion of and a removal of the detachable head relative to the structural assembly with a head-attachment structure of the structural assembly.

20. The non-transitory computer-readable medium as claimed in claim 15 further comprising moving the sample stage in a lateral direction and a vertical direction with an actuator of the scanner assembly.

* * * * *